United States Patent
Abe et al.

(10) Patent No.: US 10,174,829 B2
(45) Date of Patent: Jan. 8, 2019

(54) FOREIGN MATTER ATTRACTING STRUCTURE

(71) Applicant: SUMITOMO HEAVY INDUSTRIES, LTD., Tokyo (JP)

(72) Inventors: Kazuhisa Abe, Kurashiki (JP); Aizoh Kubo, Kyoto (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 497 days.

(21) Appl. No.: 14/850,987

(22) Filed: Sep. 11, 2015

(65) Prior Publication Data

US 2016/0003345 A1 Jan. 7, 2016

Related U.S. Application Data

(63) Continuation of application No. PCT/JP2014/000224, filed on Jan. 17, 2014.

(30) Foreign Application Priority Data

Mar. 25, 2013 (JP) .................................. 2013-062072
Aug. 20, 2013 (JP) .................................. 2013-170481

(51) Int. Cl.
*F16H 57/04* (2010.01)
*F16H 57/031* (2012.01)

(52) U.S. Cl.
CPC ..... *F16H 57/0404* (2013.01); *F16H 57/0402* (2013.01); *F16H 57/045* (2013.01); *F16H 57/031* (2013.01)

(58) Field of Classification Search
CPC . F16H 57/0404; F16H 57/0402; F16H 57/045
See application file for complete search history.

(56) References Cited

U.S. PATENT DOCUMENTS

| | | | | |
|---|---|---|---|---|
| 2,225,205 A * | 12/1940 | Brooks | ............... | B03C 1/286 138/89 |
| 3,354,989 A * | 11/1967 | Anderson | ............ | F16N 31/006 180/69.1 |
| 3,463,729 A * | 8/1969 | Bean | ....................... | B03C 1/28 210/167.03 |
| 5,702,598 A * | 12/1997 | Lemon | .................. | B01D 35/06 210/223 |
| 6,596,182 B1 * | 7/2003 | Prenger | ............. | B01J 20/28009 210/222 |
| 6,743,365 B1 | 6/2004 | Marlowe | | |
| 2002/0095763 A1 * | 7/2002 | Willis | .................. | B01D 35/027 29/453 |

(Continued)

FOREIGN PATENT DOCUMENTS

CN 1094654 A 11/1994
CN 2212109 Y 11/1995

(Continued)

*Primary Examiner* — Michael A Riegelman
(74) *Attorney, Agent, or Firm* — HEA Law PLLC

(57) ABSTRACT

A foreign matter attracting structure includes: an attracting body for attracting foreign matter in lubricating oil, wherein the attracting body includes a magnet and a capturing body which is composed of a weakly magnetic material, and the capturing body is disposed at a position which is magnetized by a magnetic force of the magnet.

12 Claims, 18 Drawing Sheets

(56) References Cited

U.S. PATENT DOCUMENTS

| | | | |
|---|---|---|---|
| 2002/0096221 A1* | 7/2002 | Kapcoe | F16H 57/0404 |
| | | | 137/590 |
| 2006/0054402 A1* | 3/2006 | Dorian | F01M 11/0408 |
| | | | 184/1.5 |
| 2013/0327687 A1 | 12/2013 | Murahashi et al. | |
| 2017/0173592 A1* | 6/2017 | Vituri | B03C 1/14 |

FOREIGN PATENT DOCUMENTS

| | | | |
|---|---|---|---|
| CN | 1299302 A | | 6/2001 |
| CN | 202478712 U | | 10/2012 |
| JP | S52-64283 U | | 11/1975 |
| JP | 58143814 A | * | 8/1983 |
| JP | S59-141294 U | | 9/1984 |
| JP | H03-17362 U | | 2/1991 |
| JP | 05-85409 U | | 11/1993 |
| JP | H05-86060 U | | 11/1993 |
| JP | 06254314 A | * | 9/1994 |
| JP | 08-117635 A | | 5/1996 |
| JP | 2976657 B2 | | 9/1999 |
| JP | 3065730 U | | 11/1999 |
| JP | 2000-266168 A | | 9/2000 |
| JP | 3165819 B2 | | 3/2001 |
| JP | 2004-122314 A | | 4/2004 |
| JP | 2006-022901 A | | 1/2006 |
| JP | 2010-279887 A | | 12/2010 |
| JP | 2012-176382 A | | 9/2012 |

* cited by examiner

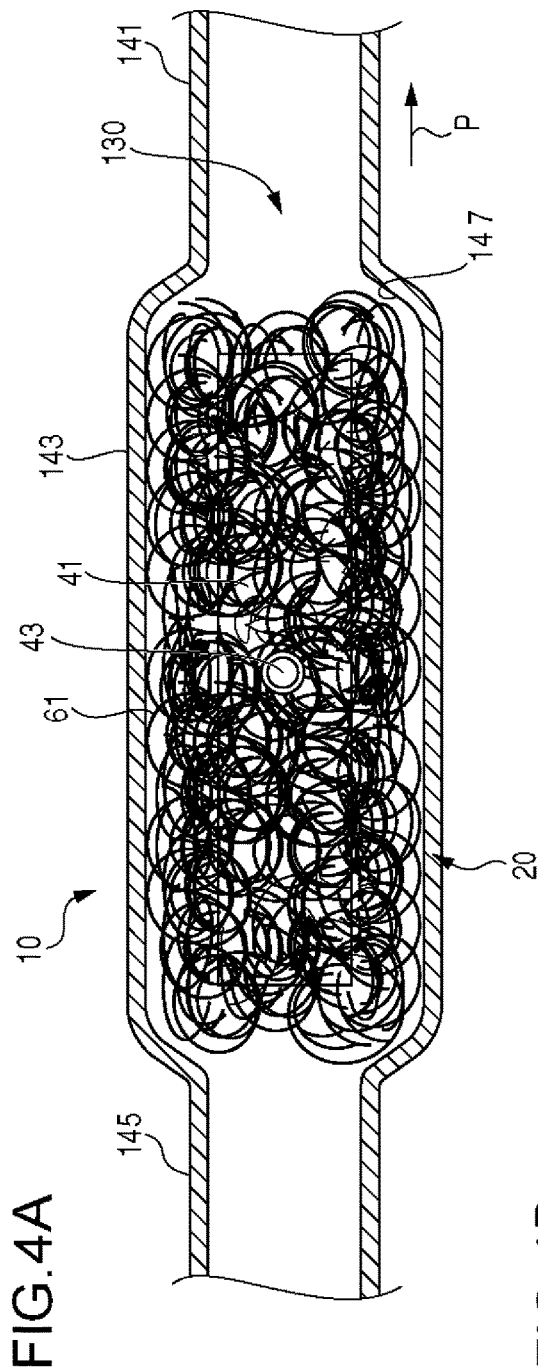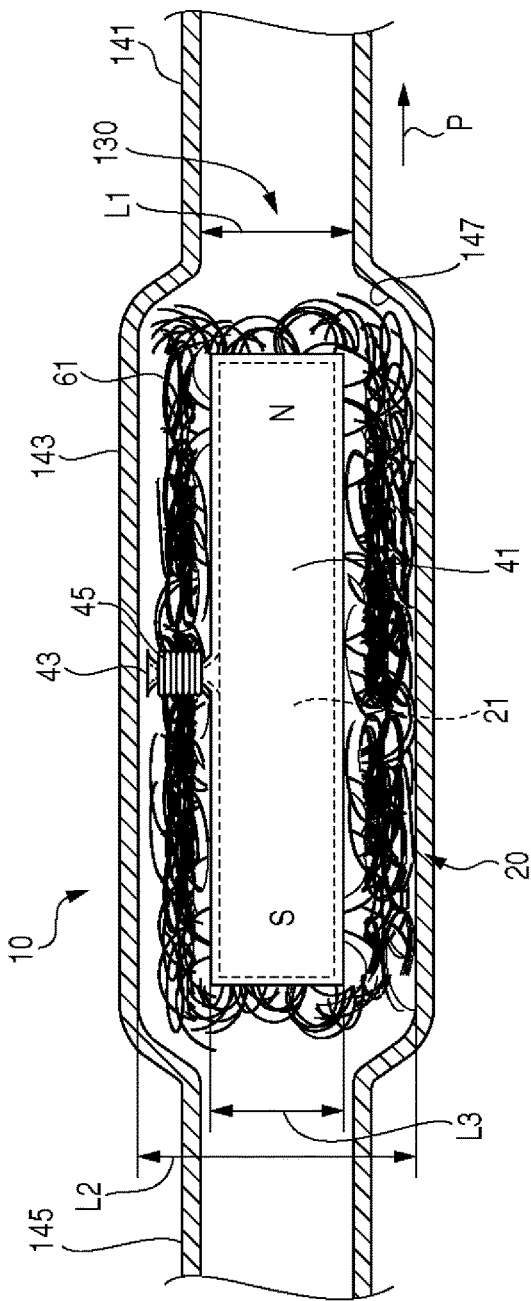

FOREIGN MATTER ATTRACTING STRUCTURE

RELATED APPLICATIONS

Priority is claimed to Japanese Patent Application No. 2013-062072, filed Mar. 25, 2013, Japanese Patent Application No. 2013-170481, filed Aug. 20, 2013, and International Patent Application No. PCT/JP2014/000224, the entire content of each of which is incorporated herein by reference.

BACKGROUND

Technical Field

Certain embodiments of the invention relate to a foreign matter attracting structure for attracting foreign matter in lubricating oil which is used in a gear device or the like by an attracting body.

Description of Related Art

In a gear device of a speed reducer or the like, in order to prevent damage to a gear or a bearing due to an operation of the gear, lubrication or cooling of the gear or the like is required. For this reason, a method of storing lubricating oil on the inside of a casing and splashing the lubricating oil to a bearing by the rotation of a gear, or a method of supplying lubricating oil to a gear and a bearing by a pump is known (refer to the related art).

SUMMARY

According to an embodiment of the present invention, there is provided a foreign matter attracting structure including: an attracting body for attracting foreign matter in lubricating oil, wherein the attracting body includes a magnet and a capturing body which is composed of a weakly magnetic material, and the capturing body is disposed at a position which is magnetized by a magnetic force of the magnet.

According to another embodiment of the present invention, there is provided a foreign matter attracting structure for attracting foreign matter in lubricating oil by an attracting body, including: a gear device which performs lubrication of a gear by the lubricating oil, wherein the attracting body includes a magnet, and a nonmagnetic cover which covers the magnet.

BRIEF DESCRIPTION OF THE DRAWINGS

FIG. 4A is a sectional plan view showing a foreign matter attracting structure according to Embodiment 2, and FIG. 4B is a sectional side view thereof.

DETAILED DESCRIPTION

In a gear device, foreign matter such as iron powder is generated due to the wear or the like of a gear. The foreign matter is mixed in lubricating oil and diffused to the gear or a bearing and some of the foreign matter is stuck thereto. This is caught in the gear or the bearing, thereby damaging the gear or the bearing or serving as resistance to the bearing, and therefore, capture and removal are required.

It is desirable to provide a foreign matter attracting structure capable of effectively capturing foreign matter in lubrication oil.

According to the foreign matter attracting structure according to an embodiment, a range which is occupied by the attracting body is widened by an amount corresponding to the capturing body, and therefore, it is possible to effectively attract the foreign matter in a wide range by the capturing body magnetized by the magnet. Further, the capturing body is composed of a weakly magnetic material, and therefore, if the distance between the capturing body and the magnet becomes more distant, the capturing body loses a magnetic force, and thus the foreign matter attracted to the capturing body can be easily removed.

According to the foreign matter attracting structure according to another embodiment, the nonmagnetic cover covers the magnet, and therefore, the surface area of the nonmagnetic cover becomes greater than the magnet, and thus the attracted amount of the foreign matter is increased, whereby it is possible to effectively attract the foreign matter. Further, if the magnet is extracted from the nonmagnetic cover, it is possible to easily remove the foreign matter attracted to the surface of the nonmagnetic cover.

[Embodiment 1]

Figure 1:
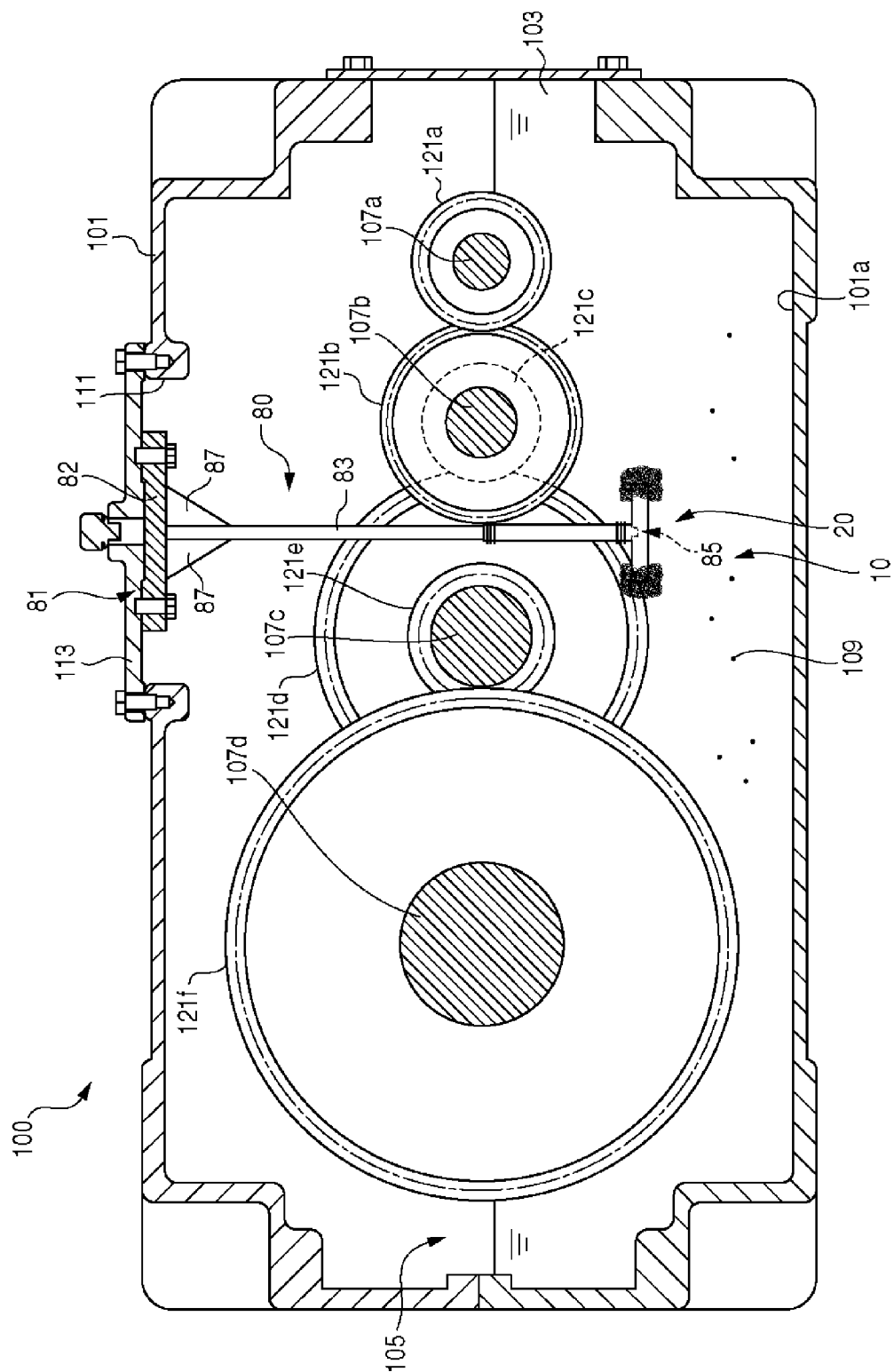
FIG. 1 is a cross-sectional front view showing a gear device according to Embodiment 1.
Figure 2:
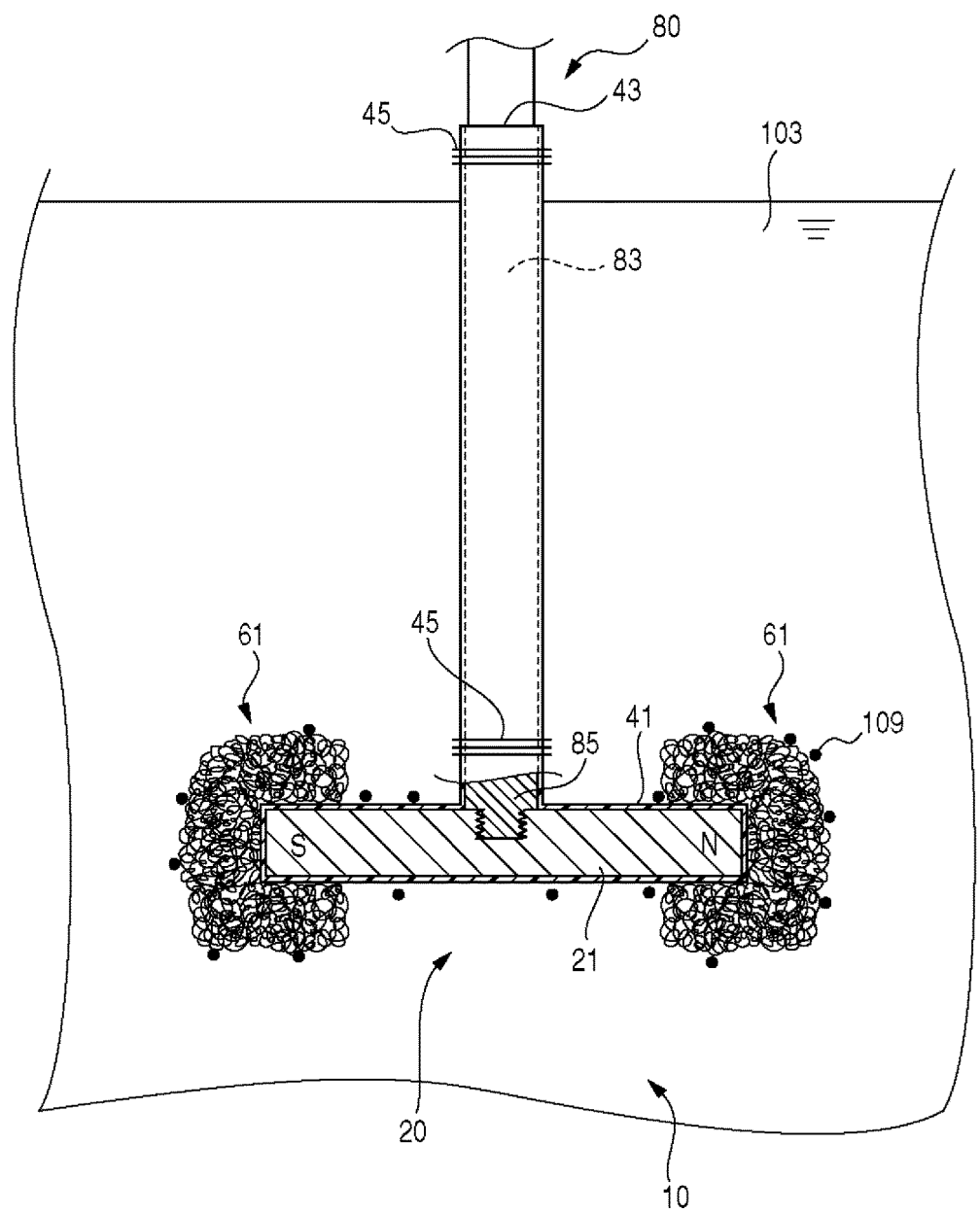
FIG. 2 is a partial sectional front view showing a foreign matter attracting structure according to Embodiment 1.

FIGS. 1 and 2 show the configuration of a foreign matter attracting structure 10 according to Embodiment 1. The foreign matter attracting structure 10 is provided with a gear device 100, an attracting body 20, and a support member 80.

The gear device 100 is a parallel-shaft gear reducer. The gear device 100 is provided with a casing 101 and a plurality of gears 121a to 121f (hereinafter, collectively referred to as a gear 121), as shown in FIG. 1.

As a space in which lubricating oil 103 is stored, a storage chamber 105 is provided in the casing 101. A plurality of shafts 107a to 107d (hereinafter, collectively referred to as a shaft 107) are provided substantially parallel to each other in the casing 101. An input shaft 107a, a first gear shaft 107b, a second gear shaft 107c, and an output shaft 107d are included in the shaft 107. Each shaft 107 is rotatably supported on the casing 101 through a bearing (not shown). In the casing 101, an inspection port 111 for inspecting the inside is provided. The inspection port 111 is opened and closed by a lid member 113. The lid member 113 is detachably mounted on the casing 101 by screws or the like.

The gear 121 is accommodated in the casing 101. An input gear 121a, a first large-diameter gear 121b, a first small-diameter gear 121c, a second large-diameter gear 121d, a second small-diameter gear 121e, and an output gear 121f are included in a plurality of the gears 121. The input gear 121a is fixed to the input shaft 107a, and the first large-diameter gear 121b and the first small-diameter gear 121c are fixed to the first gear shaft 107b. The second large-diameter gear 121d and the second small-diameter gear 121e are fixed to the second gear shaft 107c, and the output gear 121f is fixed to the output shaft 107d. Each gear 121 is provided to be partially immersed in the lubricating oil 103.

The input shaft 107a is connected to a motor (not shown). If the input shaft 107a is rotated by the driving of the motor, the rotation thereof is reduced in speed by the plurality of gears 121 and transmitted to the output shaft 107d. The lubricating oil 103 is supplied to the gear 121, the shaft 107, and a bearing by the rotation of the gear 121. Foreign matter 109 such as metal powder such as iron powder or metal debris generated by the wear of the gear 121 or the like is mixed in the lubricating oil 103.

The attracting body 20 is disposed in the lubricating oil 103 to be spaced apart from an inner bottom surface 101a of the casing 101 forming a portion of the storage chamber 105. The attracting body 20 is provided with a magnet 21, a nonmagnetic cover 41, and a capturing body 61, as shown in FIG. 2. The magnet 21 is a ferrite magnet. However, in addition to this, a permanent magnet such as a neodymium magnet is also acceptable and an electromagnet is also acceptable. In the illustrated example, the magnet 21 is formed in a columnar shape. However, the shape thereof is not limited. In the magnet 21, one end side in a longitudinal direction thereof is made so as to be the S-pole and the other end side is made so as to be the N-pole. The magnet 21 is supported by the support member 80 in a state where the longitudinal direction thereof is substantially horizontal.

The nonmagnetic cover 41 is composed of a nonmagnetic material using a film-like soft material such as a plastic film. The nonmagnetic cover 41 is formed in the form of a bag with an opening 43 provided in an upper portion thereof. In the nonmagnetic cover 41, the magnet 21 is disposed on the bottom side thereof and the support member 80 is disposed on the opening 43 side. The nonmagnetic cover 41 covers the entire outer surface of the magnet 21 and covers a lower end portion of a connection portion 83 (described later) of the support member 80. The nonmagnetic cover 41 prevents the magnet 21 from being exposed to the lubricating oil 103, thereby preventing the foreign matter 109 in the lubricating oil 103 from being attracted to the magnet 21, when the attracting body 20 is disposed in the lubricating oil 103.

The nonmagnetic cover 41 is fixed to the magnet 21 by being brought into close contact with the magnet 21 and the connection portion 83, for example, by being tightened around the connection portion 83 of the support member 80, and then winding string-like members 45 around a plurality of vertically spaced-apart places of the connection portion 83. Due to the winding of the string-like member 45, even if the foreign matter 109 in the lubricating oil 103 infiltrates from the opening 43 of the nonmagnetic cover 41, infiltration of the foreign matter 109 further toward the bottom side than the wound position is suppressed, and thus attraction of the foreign matter 109 to the magnet 21 is prevented. If the string-like members 45 are removed, it becomes possible to take in and out the magnet 21 of the attracting body 20 through the opening 43 of the nonmagnetic cover 41. The string-like member 45 is composed of a weakly magnetic material such as a soft iron wire. In addition, the string-like member 45 may be composed of a nonmagnetic material such as a synthetic fiber. Further, the nonmagnetic cover 41 may be composed of a nonmagnetic material having elasticity in order to easily take in and out the magnet 21 through the opening 43 while increasing a close contact property with the magnet 21 and the like.

The capturing body 61 is disposed on the outside of the magnet 21 and the nonmagnetic cover 41. In the illustrated example, one capturing body 61 is disposed for each of both sides in the longitudinal direction of the magnet 21 having a columnar shape. The capturing body 61 is configured, for example, by rounding a wire made of a weakly magnetic material such as a soft iron wire, thereby deforming the wire so as to be arranged into the form of cotton. That is, the capturing body 61 is configured with an aggregate of a wire made of a weakly magnetic material. The capturing body 61 is configured with the aggregate of the wire, and therefore, the capturing body 61 is configured such that the lubricating oil 103 can pass through the inside thereof. The weakly magnetic material includes a paramagnetic material such as soft iron.

An end portion in the longitudinal direction of the magnet 21 is pushed on the inside of the capturing body 61 along with the nonmagnetic cover 41, and thus the magnet 21 and the nonmagnetic cover 41 are partially covered with the capturing body 61. The position of the capturing body 61 with respect to the magnet 21, the thickness of the nonmagnetic cover 41, or the like is adjusted such that the capturing body 61 is disposed at a position which is magnetized by the magnetic force of the magnet 21. The capturing body 61 is composed of a paramagnetic material, and therefore, the capturing body 61 is magnetized by the magnetic force of the magnet 21, thereby being attracted and fixed to the magnet 21. At this time, the capturing body 61 is fixed to the outside of the magnet 21 with the nonmagnetic cover 41 interposed therebetween. Since the capturing body 61 is magnetized by the magnet 21, some of the foreign matter 109 in the lubricating oil 103 passing through the vicinity or the inside thereof is attracted thereto. In addition, in order to solidly fix the capturing body 61 to the magnet 21, the capturing body 61 may be wrapped around the magnet 21 by a string-like member of a weakly magnetic material or a nonmagnetic material.

Referring back to FIG. 1, the support member 80 is provided with a fixed portion 81, the connection portion 83 having a rod shape, and a mounting portion 85. The support member 80 is composed of a nonmagnetic material using a hard material such as plastic.

The fixed portion 81 is provided on the upper end side which is one end side of the connection portion 83, and is configured to include a plate-like member 82. The plate-like member 82 is detachably fixed to the rear surface of the lid member 113 provided outside the lubricating oil 103, by screws or the like.

The mounting portion 85 is provided on the lower end side which is the other end side of the connection portion 83, as shown in FIG. 2, and is configured with a male screw. A female screw hole is formed in the magnet 21. The mounting portion 85 is screwed into the female screw hole of the magnet 21. That is, the attracting body 20 is detachably mounted on the mounting portion 85. In addition, a configuration is also acceptable in which a male screw is provided in the magnet 21, a female screw hole is provided in the mounting portion 85, and the male screw of the magnet 21 is screwed into the female screw hole of the mounting portion 85.

When the attracting body 20 is mounted on the mounting portion 85, the attracting body 20 is supported by the support member 80, thereby being positioned in the lubricating oil 103. If a worker removes the screws or the like of the lid member 113 and grips the lid member 113 from the casing 101, the attracting body 20 can be extracted from the lubricating oil 103 to the outside of the casing 101.

Referring back to FIG. 1, a plate-like rib 87 is provided at a connection place between the connection portion 83 and the fixed portion 81, and thus the connection place has higher rigidity. When flow occurs in the lubricating oil 103 due to an operation of the gear 121 and thus a force which displaces the attracting body 20 which is on the free end side of the support member 80 acts, resistance to a bending force acting on the connection place between the connection portion 83 and the fixed portion 81, which is on the fixed end side of the support member 80, can be made by the rib 87. In addition, the rib 87 may not be provided.

An operation and the effects of the foreign matter attracting structure 10 according to Embodiment 1 will be described. When flow occurs in the lubricating oil 103 by the operation or the like of the plurality of gears 121, some of the foreign matter 109 mixed in the lubricating oil 103 is carried to the vicinity of the attracting body 20. Some of the foreign matter 109 is attracted to the surface of the nonmagnetic cover 41 or attracted and captured to the outer surface and the inside of the capturing body 61.

According to the foreign matter attracting structure 10, a range which is occupied by the attracting body 20 is widened by an amount corresponding to the capturing body 61, and therefore, it is possible to effectively attract the foreign matter 109 in a wide range by the capturing body 61 magnetized by the magnet 21. In particular, a configuration is made such that the lubricating oil 103 can pass through the inside of the capturing body 61, and therefore, the attracted amount of the foreign matter 109 by the capturing body 61 is increased. The foreign matter attracting structure 10 capable of effectively attracting the foreign matter 109 is used in the gear device 100, and therefore, a removal rate of the foreign matter 109 in the gear device 100 is increased, and thus a decrease in the life of the gear 121 or the bearing can be improved. Further, the capturing body 61 is composed of a weakly magnetic material, and therefore, if the distance between the capturing body 61 and the magnet 21 becomes more distant, for example, by extracting the magnet 21 from the nonmagnetic cover 41, the capturing body 61 loses a magnetic force, and thus the foreign matter 109 attracted to the capturing body 61 can be easily removed. The foreign matter 109 can be removed, for example, by sweeping off, shaking, suctioning, or water-washing the surface of the capturing body 61. Further, the foreign matter 109 is attracted to the capturing body 61 or the nonmagnetic cover 41 based on the magnetic force of the magnet 21, and therefore, it is possible to capture fine foreign matter 109 which is not easily captured by a filter.

Further, the nonmagnetic cover 41 covers the magnet 21, and therefore, the attraction of the foreign mater 109 to the magnet 21 is suppressed while capturing the foreign mater 109 by the capturing body 61 and the nonmagnetic cover 41. If the magnet 21 is extracted from the nonmagnetic cover 41, a magnetic force does not act on the foreign mater 109 attracted to the nonmagnetic cover 41, and thus it is possible to easily remove the foreign mater 109. Accordingly, it is possible to easily remove the foreign mater 109 attracted to the capturing body 61 and the nonmagnetic cover 41 while suppressing the attraction of the foreign mater 109 to the magnet 21.

Further, the fixed portion 81 of the support member 80 is fixed outside the lubricating oil 103, and therefore, a worker can grip the fixed portion 81 and extract the attracting body 20 without putting the hand in the lubricating oil 103. In particular, the fixed portion 81 is fixed to the lid member 113, and therefore, when the lid member 113 is removed, the attracting body 20 is extracted to the outside of the casing 101, and thus it is possible to confirm the attraction situation of the foreign matter 109 to the attracting body 20, along with the inspection of the inside of the casing 101.

[Embodiment 2]

Figure 3:
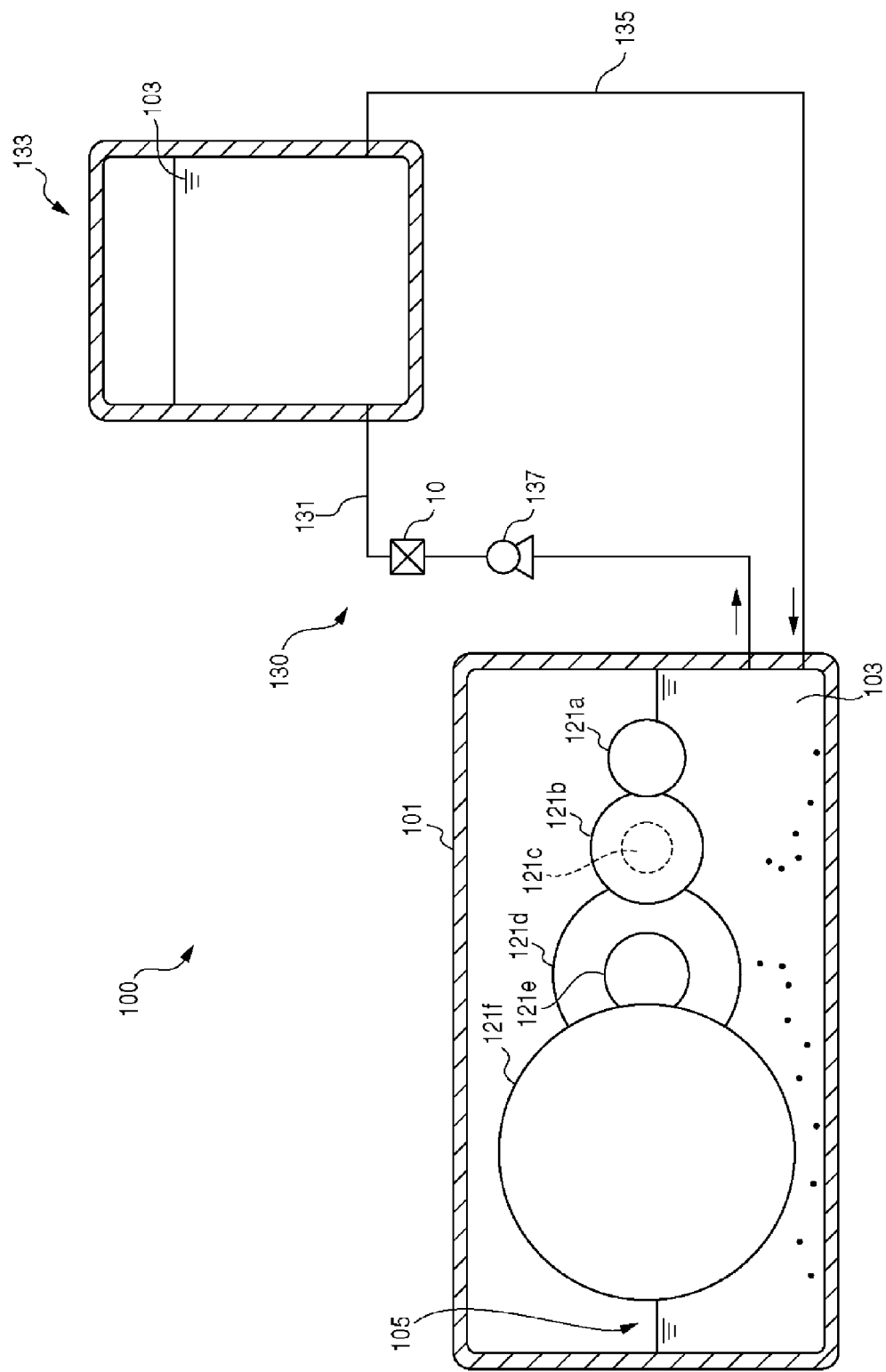
FIG. 3 is a block diagram showing a gear device according to Embodiment 2.

FIGS. 3, 4A, and 4B show the configuration of the foreign matter attracting structure 10 according to Embodiment 2. In addition, in FIG. 4B, in order to simplify a description, a portion of the capturing body 61 is omitted. In the following Embodiments 2 to 7, the same elements as the elements described in Embodiment 1 are denoted by the same reference numerals and overlapping description is omitted.

The foreign matter attracting structure 10 is further provided with a lubricating oil flow path 130 through which the lubricating oil 103 flows. In the illustrated example, the lubricating oil flow path 130 is configured as a circulation flow path for a dry sump. A suction passage 131, an oil tank 133, and a discharge passage 135 are provided in order in the course of the lubricating oil flow path 130. A pump 137 and the foreign matter attracting structure 10 are provided in order in the course of the suction passage 131. In the lubricating oil flow path 130, the lubricating oil 103 in the lubricating oil flow path 130 is forcibly transported by the driving of the pump 137. The lubricating oil 103 is sucked from the storage chamber 105 in the casing 101 and discharged to the storage chamber 105 through the suction passage 131, the oil tank 133, and the discharge passage 135. The oil tank 133 is provided separately from the storage chamber 105 of the casing 101 in order to store the lubricating oil 103.

The foreign matter attracting structure 10 is not provided with the support member 80 described in Embodiment 1, as shown in FIGS. 4A and 4B. The magnet 21 is disposed in the lubricating oil flow path 130 with the longitudinal direction thereof being substantially parallel to a flow direction P of the lubricating oil flow path 130.

The nonmagnetic cover 41 is formed in the form of a bag with the opening 43 provided in the upper portion thereof. In the nonmagnetic cover 41, the magnet 21 is disposed on the bottom side thereof, and the nonmagnetic cover 41 covers the entire outer surface of the magnet 21. The nonmagnetic cover 41 is fixed to the magnet 21 by winding the string-like member 45 around the upper portion thereof.

The capturing body 61 is configured with an aggregate of a wire collected, for example, by rounding and deforming a wire made of a weakly magnetic material, and is disposed so as to cover the entirety of the magnet 21 and the magnetic cover 41.

The lubricating oil flow path 130 has an exit-side small-diameter portion 141, a large-diameter portion 143 provided on the upstream side in the flow direction P of the exit-side small-diameter portion 141, and an entry-side small-diameter portion 145 provided on the upstream side in the flow direction P of the large-diameter portion 143. A flow path inner diameter L2 of the large-diameter portion 143 is greater than a flow path inner diameter L1 of each of the exit-side small-diameter portion 141 and the entry-side small-diameter portion 145. The attracting body 20 is disposed in the large-diameter portion 143. Even if the attracting body 20 moves to the downstream side due to the flow of the lubricating oil 103, the attracting body 20 is engaged with a step portion 147 between the exit-side small-diameter portion 141 and the large-diameter portion 143, and thus the position thereof is maintained.

The attracting body 20 is configured such that a maximum length L3 in a radial direction of a portion which includes the magnet 21 and the nonmagnetic cover 41 is smaller than the flow path inner diameter L1 of each of the exit-side small-diameter portion 141 and the entry-side small-diameter portion 145. The capturing body 61 configured with the aggregate of the wire is elastically deformed, and therefore, the attracting body 20 can be disposed in the large-diameter portion 143 by pushing the attracting body 20 from the exit-side small-diameter portion 141 or the entry-side small-diameter portion 145 into the large-diameter portion 143.

According to Embodiment 2 above, the attracting body 20 is disposed in the lubricating oil flow path 130, and therefore, the foreign matter 109 can be attracted and captured by the nonmagnetic cover 41 or the capturing body 61, and thus the attracting body 20 can be used as a strainer which captures the foreign matter 109 in the lubricating oil 103 flowing through the lubricating oil flow path 130. In particular, the attracting body 20 configured such that the lubricating oil 103 can pass through the inside thereof is used, and therefore, it is possible to effectively capture the foreign matter 109 without significantly inhibiting the flow of the lubricating oil 103.

Further, in using the attracting body 20 in the gear device 100, the attracting body 20 is installed in the lubricating oil flow path 130 away from the storage chamber 105, and therefore, the operation of the gear 121 or the like in the storage chamber 105 is not inhibited by the magnetic force of the magnet 21. Accordingly, the magnet 21 having a large attractive force can be used, and thus the attracted amount of the foreign matter 109 can be increased.

In addition, in order to maintain the position of the attracting body 20 in the lubricating oil flow path 130, the large-diameter portion 143 is provided in the lubricating oil flow path 130 and the attracting body 20 is engaged with the step portion 147 between the exit-side small-diameter portion 141 and the large-diameter portion 143. However, means for maintaining the position is not limited thereto. For example, the position may be maintained by providing projections on the inner surface of the lubricating oil flow path 130 and making the capturing body 61 or the like of the attracting body 20 be engaged with the projections.

Further, as a modified example, the attracting body 20 may be disposed in the oil tank 133. It is possible to increase the size of the attracting body 20, rather than disposing the attracting body 20 in the suction passage 131 or the discharge passage 135, and thus it is possible to increase the attracted amount of the foreign matter 109. Further, the lubricating oil flow path 130 may be provided in the casing 101 separately from the storage chamber 105. Further, in order to increase the attracted amount of the foreign matter 109, the attracting body 20 may be provided so as to cross the cross section orthogonal to the flow direction P of the lubricating oil flow path 130.

Further, as a modified example, the foreign matter attracting structure 10 may be installed on the upstream side of the pump 137 rather than the downstream side, in the course of the suction passage 131. Further, the foreign matter attracting structure 10 maybe installed in the discharge passage 135. Further, the oil tank 133 may not be provided in the lubricating oil flow path 130.

[Embodiment 3]

Figure 5:
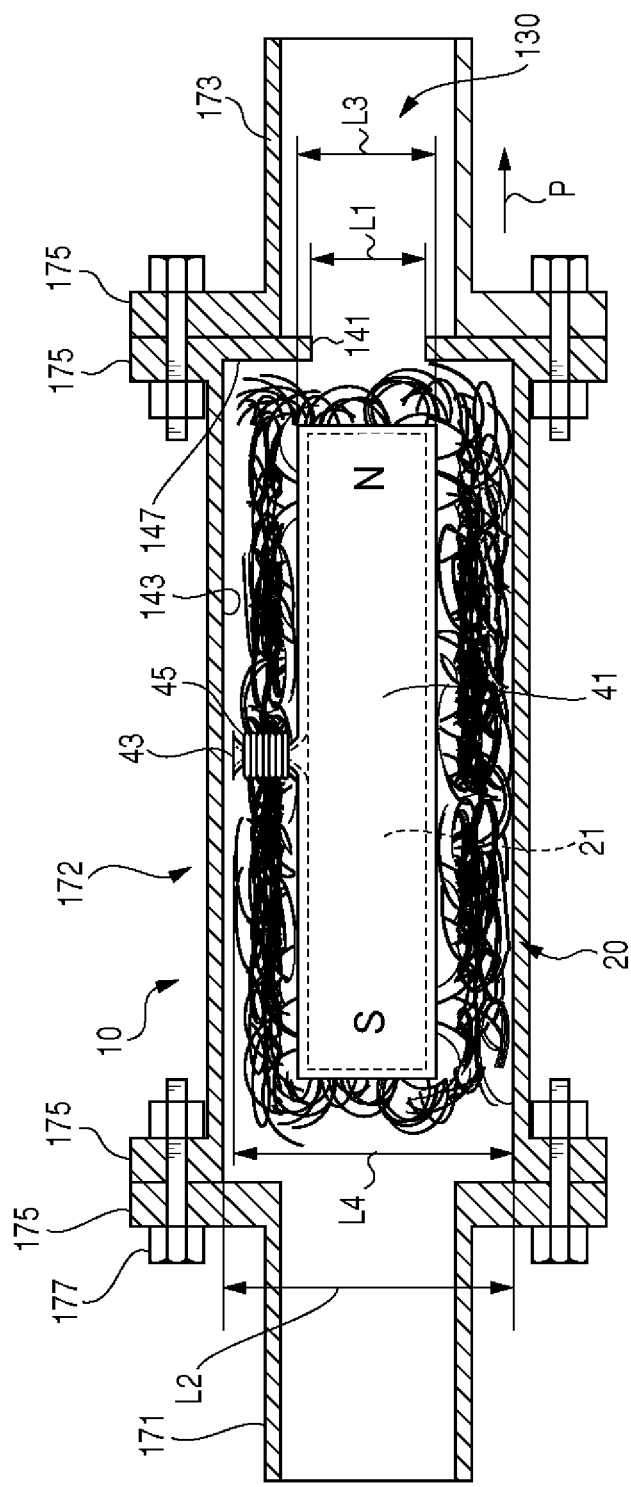
FIG. 5 is a sectional side view showing a foreign matter attracting structure according to Embodiment 3.

FIG. 5 shows the configuration of the foreign matter attracting structure 10 according to Embodiment 3. The foreign matter attracting structure 10 is provided with an introduction pipe 171 (a second flow path member), a relay pipe 172 (a first flow path member), and a discharge pipe 173 which are disposed in order from the upstream side to the downstream side in the flow direction P of the lubricating oil flow path 130.

A portion of the lubricating oil flow path 130 is formed in each of the introduction pipe 171, the relay pipe 172, and the discharge pipe 173. Each of the pipes 171 to 173 has a flange portion 175 provided at an end portion in the flow direction P thereof. The respective pipes 171 to 173 are detachably connected by bolts 177 penetrating the flange portions 175 thereof, after the flange portions 175 are butted against each other, thereby being brought into surface contact with each other. The introduction pipe 171 is detachably connected to the relay pipe 172 from the upstream side in the flow direction P.

The exit-side small-diameter portion 141 and the large-diameter portion 143 provided on the upstream side in the flow direction P of the exit-side small-diameter portion 141 are formed in the relay pipe 172, and the attracting body 20 is disposed in the large-diameter portion 143. The attracting body 20 is configured such that the maximum length L3 in the radial direction of a portion which includes the magnet 21 and the nonmagnetic cover 41 is greater than the flow path inner diameter L1 of the exit-side small-diameter portion 141. In this way, even if the attracting body 20 moves to the downstream side due to the flow of the lubricating oil 103, the attracting body 20 is solidly engaged with the step portion 147 between the exit-side small-diameter portion 141 and the large-diameter portion 143, and thus the position thereof is easily maintained.

The attracting body 20 is configured such that a maximum length L4 in the radial direction of the entirety thereof is smaller than the flow path inner diameter L2 of the large-diameter portion 143. When the relay pipe 172 is removed from the introduction pipe 171, the attracting body 20 can be easily extracted from an opening on the upstream side in the flow direction P of the relay pipe 172 to the outside.

According to Embodiment 3 above, when the relay pipe 172 is removed from the introduction pipe 171, it is possible to extract the attracting body 20 from the relay pipe 172 to the outside. Accordingly, even in a case where the attracting body 20 is disposed in the lubricating oil flow path 130, the attracting body 20 is easily extracted to the outside, and thus workability during maintenance becomes good. Further, the exit-side small-diameter portion 141 and the large-diameter portion 143 are formed in the relay pipe 172, and therefore, the position of the attracting body 20 can be maintained regardless of the flow path inner diameter of the discharge pipe 173 which is connected to the relay pipe 172.

In addition, the relay pipe 172 has been described as the first flow path member with the exit-side small-diameter portion 141 and the large-diameter portion 143 formed therein, and the introduction pipe 171 has been described as the second flow path member which is detachably connected to the relay pipe 172 and in which a portion of the lubricating oil flow path 130 is formed therein. However, the first flow path member and the second flow path member are not limited to a tubular body. Further, the exit-side small-diameter portion 141 may not be formed in the relay pipe 172, and a portion equivalent to the exit-side small-diameter portion 141 may be formed in the discharge pipe 173. Further, a configuration may be made in which in the relay pipe 172, the exit-side small-diameter portion 141 is not provided on the downstream side of the large-diameter 143 and the entry-side small-diameter portion 145 is provided on the upstream side, and thus the attracting body 20 can be extracted from the downstream side to the outside. If the exit-side small-diameter portion 141 or the entry-side small-diameter portion 145 is provided in the relay pipe 172, at the time of connection of the relay pipe 172 to the introduction pipe 171 or the like, the attracting body 20 in the large-diameter portion 143 of the relay pipe 172 is engaged with the exit-side small-diameter portion 141 or the entry-side small-diameter portion 145, thereby being prevented from coming out, and thus workability becomes good.

[Embodiment 4]

Figure 6:
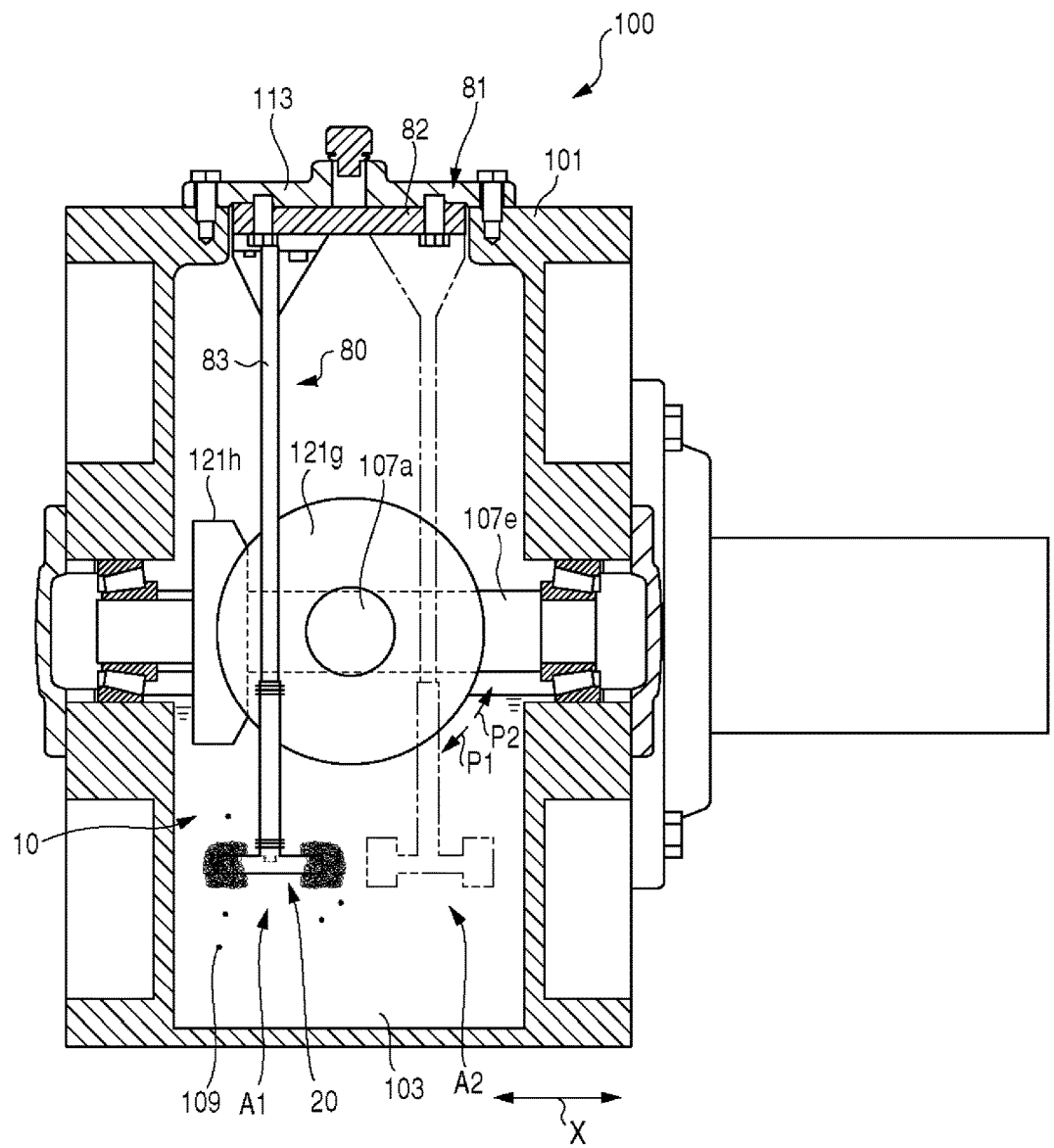
FIG. 6 is a sectional front view showing a gear device according to Embodiment 4.
Figure 7:
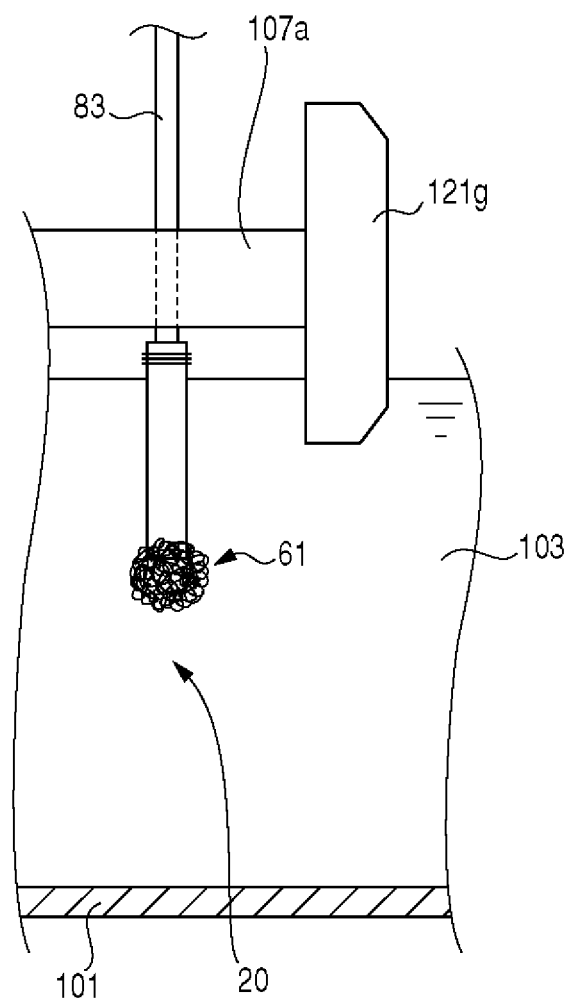
FIG. 7 is a partial sectional side view showing the gear device according to Embodiment 4.

FIGS. 6 and 7 show the foreign matter attracting structure 10 according to Embodiment 4. The gear device 100 is an orthogonal-shaft gear reducer, unlike Embodiment 1. In the gear device 100, a first bevel gear 121g fixed to the input shaft 107a meshes with a second bevel gear 121h fixed to an intermediate shaft 107e. Hereinafter, a direction parallel to the intermediate shaft 107e is referred to as an X-direction.

The connection portion 83 of the support member 80 can be connected to any of a plurality of places of the fixed portion 81. That is, the fixed portion 81 has a plurality of mounting portions for connecting the connection portion 83 of the support member 80. By a change of a connection place of the support member 80, the attracting body 20 can be installed at any of a plurality of positions A1 and A2 in the casing 101. In FIG. 6, the first position A1 which is one position where the installation of the attracting body 20 is possible is shown by a solid line, and the second position A2 which is another position is shown by a two-dot chain line. When the attracting body 20 is installed at the first position A1, the attracting body 20 is located to be deviated from the input shaft 107a to one side in the X-direction, and when the attracting body 20 is installed at the second position A2, the attracting body 20 is located to be deviated from the input shaft 107a to the other side in the X-direction.

If flow occurs in the lubricating oil 103 due to the rotation of the first bevel gear 121g and the second bevel gear 121h, much foreign matter is gathered in a portion in the storage chamber 105 according to the rotation direction of the first bevel gear 121g. The first position A1 where the attracting body 20 is installed is provided at a position where much foreign matter 109 is gathered when the first bevel gear 121g rotates in a positive direction P1. On the other hand, the second position A2 is provided at a position where much foreign matter 109 is gathered when the first bevel gear 121g rotates in a reverse direction. The rotation direction of the first bevel gear 121g is grasped in advance and the attracting body 20 is disposed at a position where much foreign matter 109 is gathered, of the plurality of positions A1 and A2.

According to Embodiment 4, the attracting body 20 can be installed at a position selected from a plurality of positions, and therefore, if the installation position of the attracting body 20 is changed according to the rotation direction of the first bevel gear 121g, it is possible to effectively attract the foreign matter 109. In addition, a plurality of the attracting bodies 20 may be installed at both the position A1 and the position A2.

[Embodiment 5]

Figure 8:
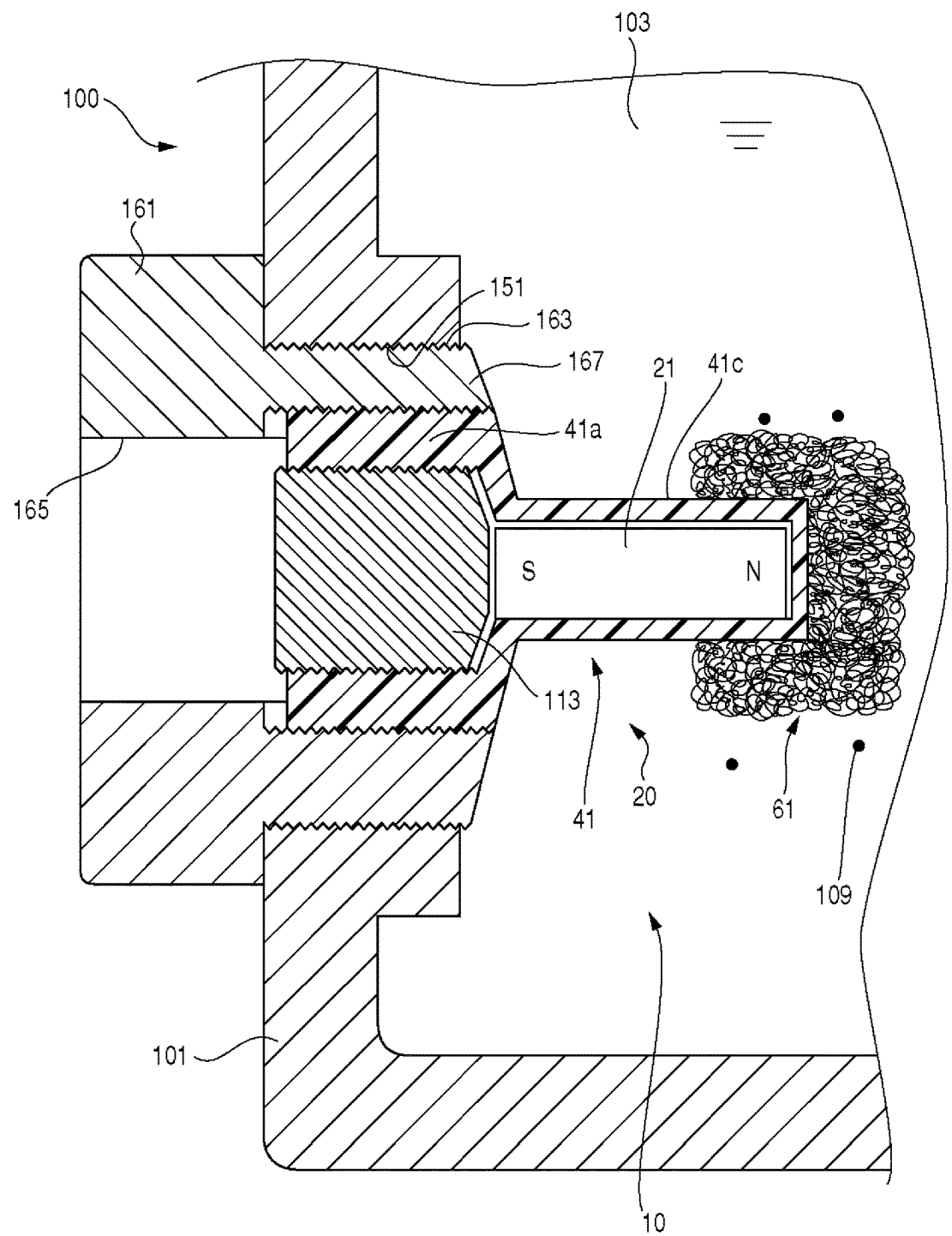
FIG. 8 is a partial sectional view showing a foreign matter attracting structure according to Embodiment 5.

FIG. 8 shows the configuration of the foreign matter attracting structure 10 according to Embodiment 5. The casing 101 of the gear device 100 is further provided with a drain portion 151 and a drain plug 161. The drain portion 151 is provided in order to discharge the lubricating oil 103 in the casing 101.

The drain plug 161 is composed of a weakly magnetic material such as soft iron. The drain plug 161 has a screw portion 163 which is screwed into a female screw hole formed in the drain portion 151. That is, the drain plug 161 is detachably mounted on the drain portion 151. The drain plug 161 has a through-hole 165 formed at the center thereof. A mounting portion 167 on which the nonmagnetic cover 41 is detachably mounted is provided at an end portion on the casing 101 side, which is one end portion of the through-hole 165.

The attracting body 20 is provided with the magnet 21, the nonmagnetic cover 41, and the capturing body 61. The nonmagnetic cover 41 is composed of a nonmagnetic material using a hard material such as plastic. The nonmagnetic cover 41 has a mounting portion 41a which is mounted on the mounting portion 167 of the drain plug 161, and a magnet accommodating portion 41c which accommodates the magnet 21.

The nonmagnetic cover 41 is formed in the form of a bottomed tube, and the mounting portion 41a is provided on one end side which is the inlet side, and the magnet accommodating portion 41c is provided on the other end side which is the bottom side. When the mounting portion 41a is mounted on the mounting portion 167 of the drain plug 161, the magnet accommodating portion 41c is disposed in the lubricating oil 103. The mounting portion 41a of the nonmagnetic cover 41 is mounted on the mounting portion 167 of the drain plug 161, whereby the attracting body 20 is fixed to the drain plug 161.

In the nonmagnetic cover 41, the magnet 21 can be taken in and out of the magnet accommodating portion 41c through an inlet of the mounting portion 41a. The inlet of the mounting portion 41a is blocked by the lid member 113 which is screwed into a female screw hole formed on the inside of the mounting portion 41a. That is, the lid member 113 is detachably fixed to the inside of the mounting portion 41a. A fixing method of the lid member 113 to the mounting portion 41a is not limited to a screw, and for example, the fixing may be performed by using a bolt or the like. In the attracting body 20, if the lid member 113 is removed, the magnet 21 can be taken in and out of the nonmagnetic cover 41.

The capturing body 61 is configured by arranging a wire made of a weakly magnetic material into the form of cotton. The magnet accommodating portion 41c of the nonmagnetic cover 41 is pushed into the capturing body 61. The capturing body 61 is disposed so as to cover the magnet accommodating portion 41c of the nonmagnetic cover 41 and the magnet 21 on the inside of the magnet accommodating portion 41c. The capturing body 61 is magnetized by the magnetic force of the magnet 21, thereby being attracted to the magnet 21 and fixed to the magnet 21 with the nonmagnetic cover 41 interposed therebetween.

According to Embodiment 5, when the drain plug 161 is removed from the casing 101, the attracting body 20 is extracted, and thus it is possible to confirm the attraction situation of the foreign matter 109 to the attracting body 20, along with the discharge of the lubricating oil 103 from the inside of the casing 101. Further, when the drain plug 161 is removed from the casing 101, the lid member 113 is also removed, and if the magnet 21 is extracted from the magnet accommodating portion 41c, it is possible to easily remove the foreign matter 109 stuck to the outer peripheral surface of the magnet accommodating portion 41c which is a portion of the nonmagnetic cover 41.

[Embodiment 6]

Figure 9:
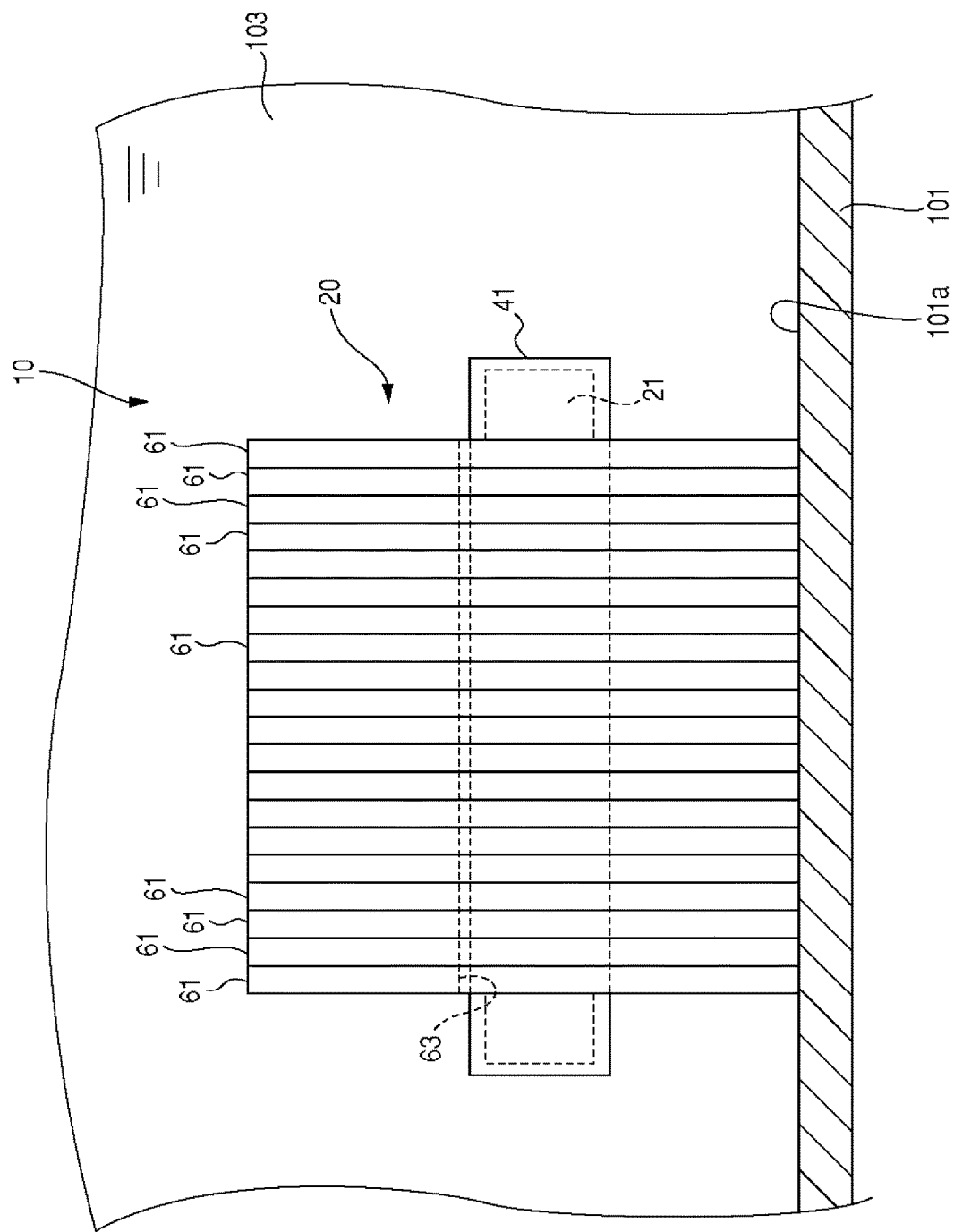
FIG. 9 is a sectional front view showing a foreign matter attracting structure according to Embodiment 6.
Figure 10:
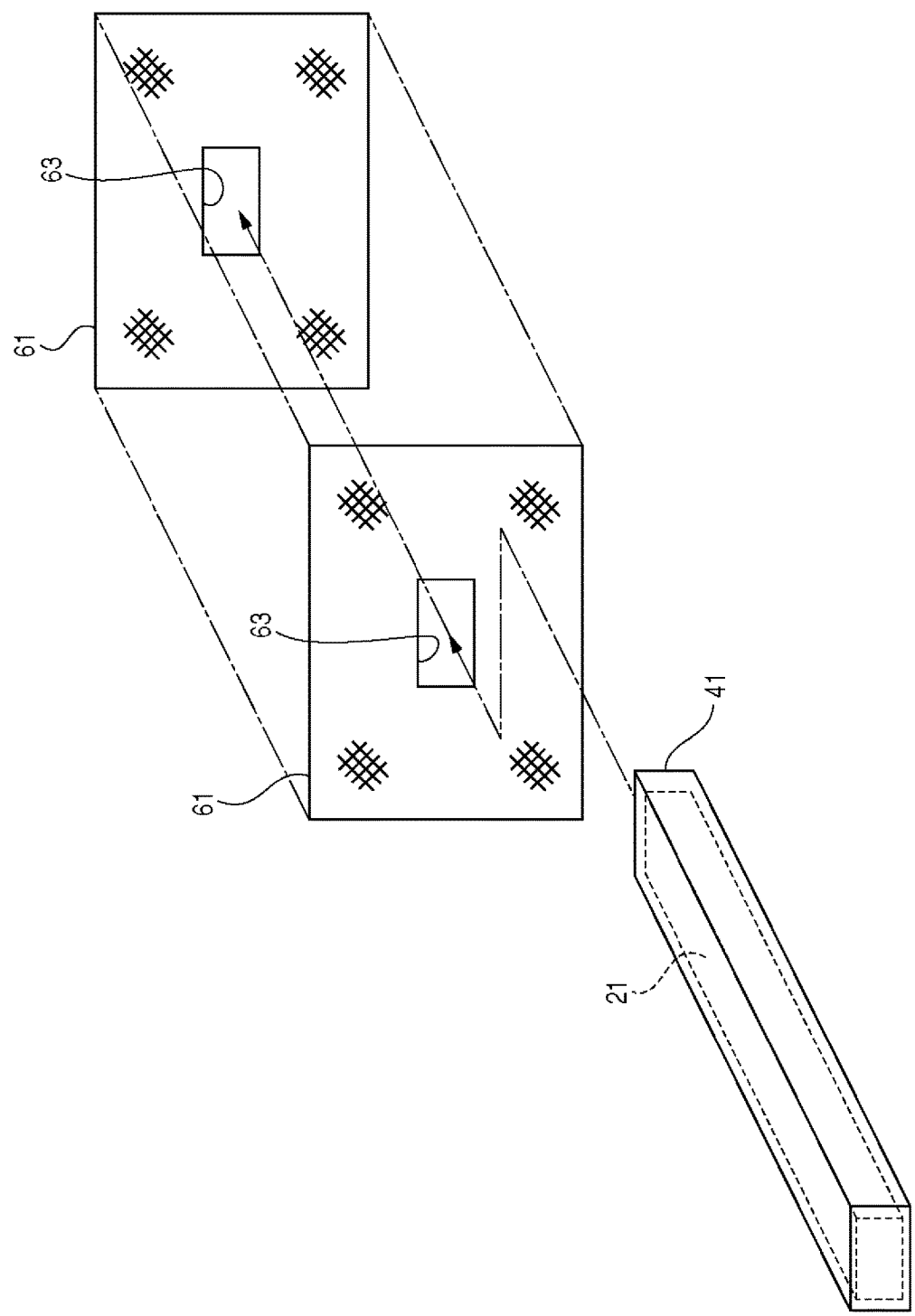
FIG. 10 is a partially exploded perspective view showing the foreign matter attracting structure according to Embodiment 6.

FIGS. 9 and 10 show the attracting body 20 according to Embodiment 6. The attracting body 20 is placed and disposed on the inner bottom surface 101a of the casing 101.

The capturing body 61 is configured into the form of a net intertwined with a wire made of a weakly magnetic material such as soft iron. That is, the capturing body 61 is configured with an aggregate of a wire made of a weakly magnetic material. A plurality of the capturing bodies 61 are disposed by being arranged substantially parallel to each other in the thickness direction. In FIG. 10, in order to simplify a description, only the capturing bodies 61 on both end sides in the thickness direction, among the plurality of capturing bodies 61, are shown. In the plurality of capturing bodies 61, through-holes 63 into which the magnet 21 and the nonmagnetic cover 41 are inserted are formed in intermediate portions thereof. The capturing body 61 is composed of a paramagnetic material, and therefore, the capturing body 61 is magnetized by the magnet 21, thereby being attracted and fixed to the magnet 21. In addition, in order to solidly fix the plurality of reticular capturing bodies 61, a string-like member may be wound around them.

[Embodiment 7]

Figure 11:
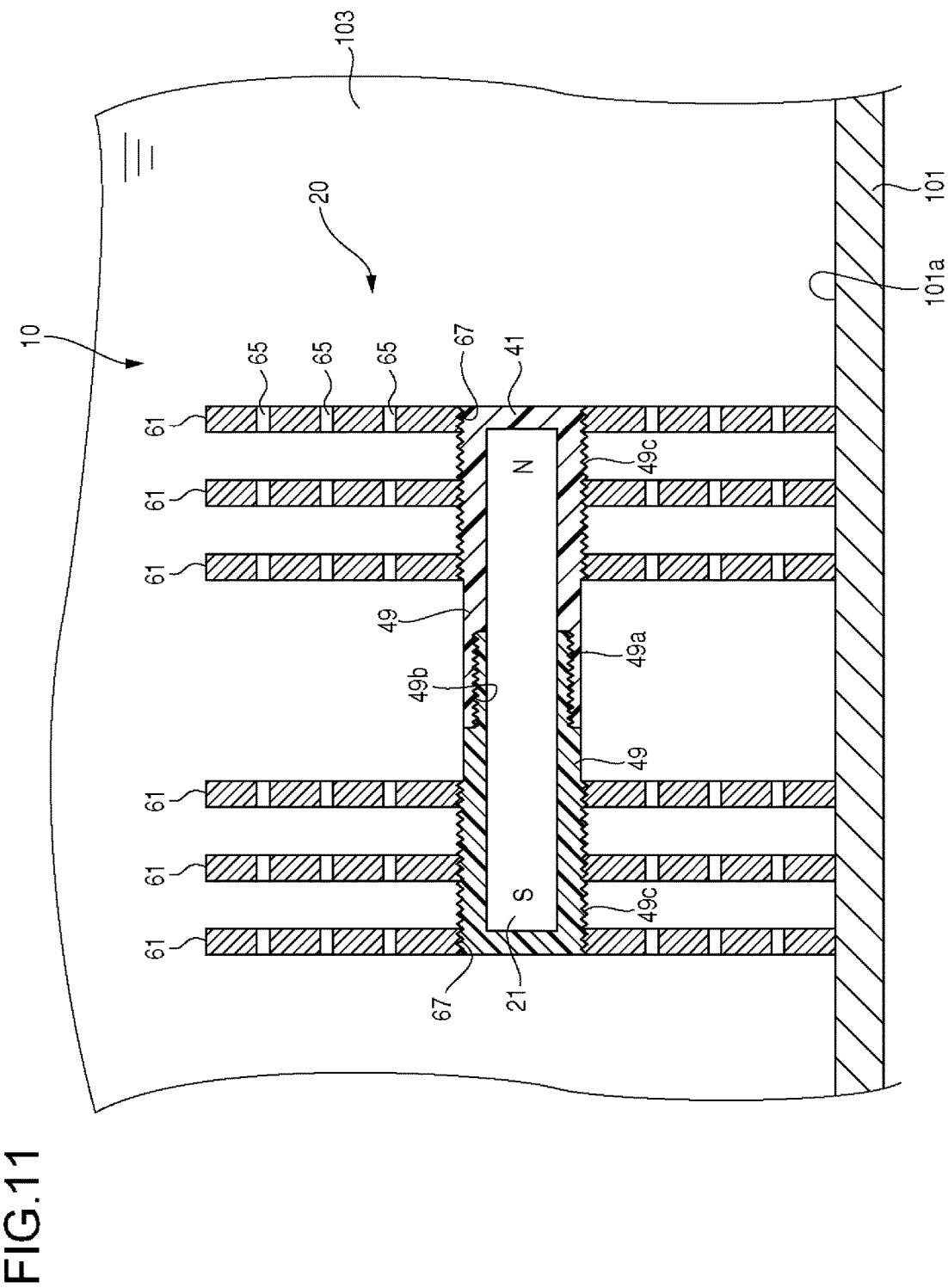
FIG. 11 is a sectional front view showing a foreign matter attracting structure according to Embodiment 7.

FIG. 11 shows the attracting body 20 according to Embodiment 7. The nonmagnetic cover 41 is composed of a nonmagnetic material using a hard material such as plastic. The nonmagnetic cover 41 is configured by connecting a pair of divided members 49 each having the form of a bottomed tube and covers the entire outer surface of the magnet 21. The magnet 21 is taken in and out through an opening of the divided member 49. In the pair of divided members 49, a male screw portion 49a is provided at an end portion on the opening side of the divided member 49 on one side and a female screw portion 49b is provided at an end portion on the opening side of the divided member 49 on the other side, and thus the pair of divided members 49 is detachably connected by screwing the male screw portion 49a into the female screw portion 49b. If the divided member 49 on the other side is removed from the divided member 49 on one side, it becomes possible to take in and out the magnet 21 from the divided member 49 configuring the nonmagnetic cover 41.

The capturing body 61 is configured with a plate-like member of a weakly magnetic material with a plurality of through-holes 65 formed therein. The capturing body 61 is configured such that the lubricating oil 103 can pass through the inside through the through-holes 65. The capturing body 61 has a screw hole 67 formed in a central portion thereof, and male screw portions 49c are formed in the outer peripheral surfaces of the divided members 49. The capturing body 61 is detachably connected by screwing the male screw portion 49c of the divided member 49 into the screw hole 67. A plurality of the capturing bodies 61 are disposed at intervals in the longitudinal direction of the magnet 21 on the outside of the magnet 21. In addition, the through-hole 65 may not be formed.

As in Embodiment 6 above, an aggregate of a wire configured into the form of cotton, the form of a net, or the like is included in the capturing body 61. Further, as in Embodiment 7, in addition to the aggregate of a wire, a plate-like member is included in the capturing body 61, and in addition to this, a tubular member or the like may be included in the capturing body 61.

[Embodiment 8]

Figure 12:
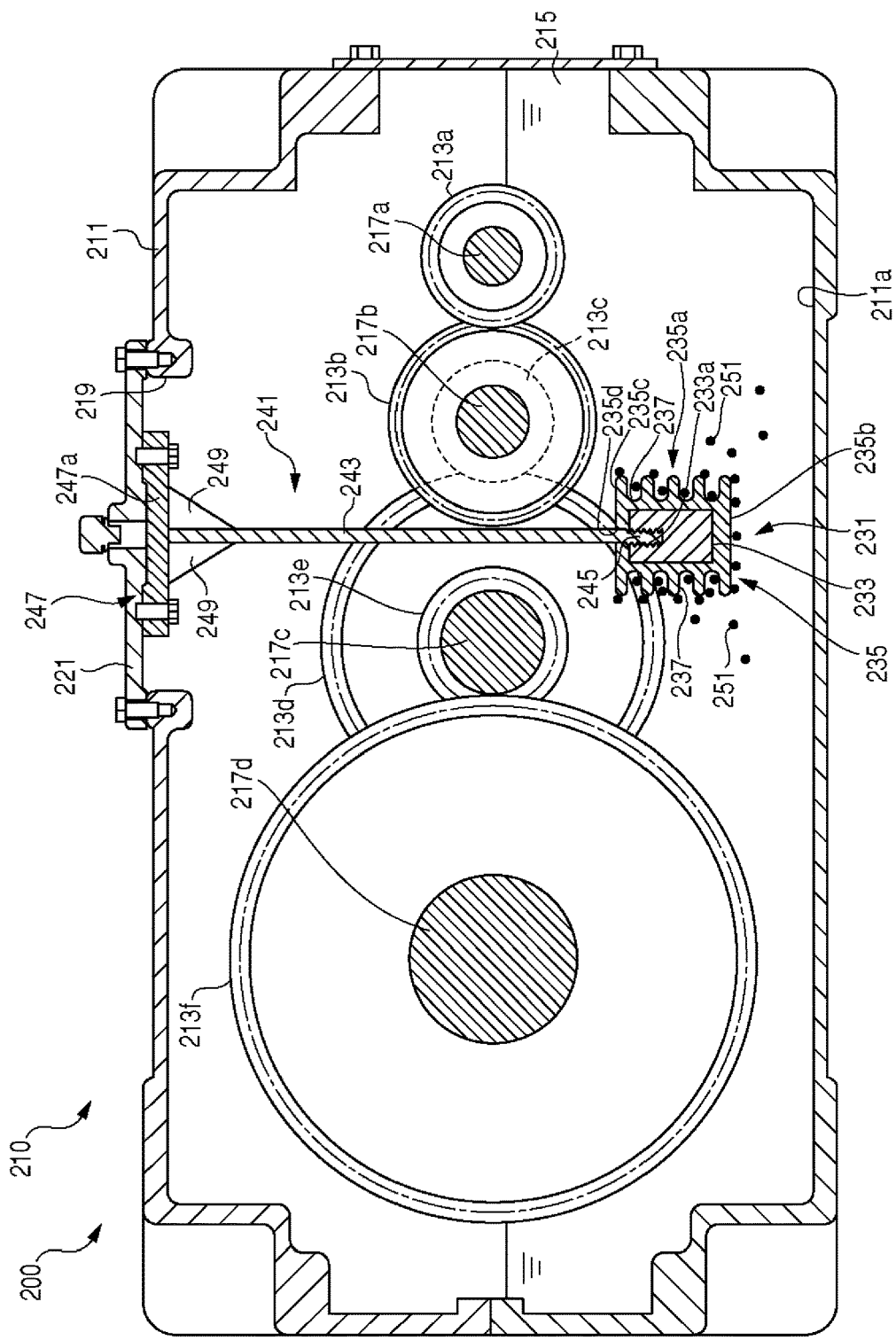
FIG. 12 is a sectional front view showing a foreign matter attracting structure according to Embodiment 8.

FIG. 12 shows the configuration of a foreign matter attracting structure 200 according to Embodiment 8. The foreign matter attracting structure 200 is provided with a gear device 210, a casing 211, an attracting body 231, and a support member 241. The gear device 210 is a parallel-shaft gear reducer. The casing 211 accommodates a plurality of gears 213a to 213f. In the gear device 210, lubricating oil 215 is stored in the casing 211 and the plurality of gears 213a to 213f are installed with them partially immersed in the lubricating oil 215.

In the casing 211, an input shaft 217a, a first gear shaft 217b, a second gear shaft 217c, and an output shaft 217d are provided in parallel, and the shafts 217a to 217d are rotatably supported on the casing 211 through bearings (not shown). In the casing 211, a first inspection port 219 for inspecting the inside is provided. The first inspection port 219 is opened and closed by a first lid member 221, and the first lid member 221 is detachably mounted on the casing 211 by screws or the like.

The input shaft 217a is connected to a motor (not shown).

The input gear 213a is fixed to the input shaft 217a, and the first large-diameter gear 213b and the first small-diameter gear 213c are fixed to the first gear shaft 217b. The second large-diameter gear 213d and the second small-diameter gear 213e are fixed to the second gear shaft 217c, and the output gear 213f is fixed to the output shaft 217d. In the shafts 217a to 217d, the respective gears 213a to 213f mesh with each other, and if the input shaft 217a is rotated by the driving of the motor, the rotation thereof is reduced in speed and transmitted to the output shaft 217d. At this time, the lubricating oil 215 is supplied to the respective sites of the gears 213a to 213f by the rotation of the gears 213a to 213f, and thus the lubrication of the gears 213a to 213f is performed.

The attracting body 231 is installed in the lubricating oil 215 to be spaced apart from an inner bottom surface 211a of the casing 211 (the attracting body 231 and the inner bottom surface 211a may be in contact with each other). The attracting body 231 is provided with a magnet 233 and a nonmagnetic cover 235. The magnet 233 is formed in a columnar shape and is configured with a permanent magnet such as a ferrite magnet or a neodymium magnet.

The nonmagnetic cover 235 is provided with a tubular body portion 235a, and a bottom portion 235b and a top portion 235c on both sides of the body portion 235a. The nonmagnetic cover 235 is composed of a hard nonmagnetic material such as plastic. The nonmagnetic cover 235 covers the entire outer surface of the magnet 233. In the nonmagnetic cover 235, ring-shaped groove portions 237 along the outer periphery thereof are formed side by side in a vertical direction. The groove portion 237 is along the entire circumference in a circumferential direction of the body portion 235a. That is, the nonmagnetic cover 235 has a shape in which a large-diameter ring portion and a small-diameter ring portion are alternately disposed.

The attracting body 231 attracts foreign matter 251 in the vicinity thereof by the magnet 233. The foreign matter 251 is metal powder such as iron powder or metal debris generated by wear. The foreign matter 251 is mixed in the lubricating oil 215, and flow occurs in the lubricating oil 215 due to the operation of the gears 213a to 213f, whereby some of the foreign matter 251 is carried to the vicinity of the attracting body 231. The foreign matter 251 attracted to the magnet 233 is attracted to the surface of the nonmagnetic cover 235, and some of the foreign matter 251 is retained in the groove portions 237. The magnet 233 is configured so as to have a magnetic field to the extent that it does not magnetize each component such as the gears 213*a* to 213*f* while attracting the foreign matter 251.

The support member 241 is provided with a rod-like connection portion 243, a mounting portion 245, and a fixed portion 247. The support member 241 is composed of a nonmagnetic material or a weakly magnetic material. The mounting portion 245 is a male screw formed on one end side of the connection portion 243. A female screw hole 233*a* is formed in the magnet 233. The mounting portion 245 is screwed into the female screw hole 233*a* through a through-hole 235*d* formed in the nonmagnetic cover 235. That is, the attracting body 231 is detachably mounted on the mounting portion 245.

The fixed portion 247 is connected to the other end side of the connection portion 243. The fixed portion 247 includes a plate-like member 247*a* detachably fixed to the rear surface of the first lid member 221 by screws or the like. The fixed portion 247 is fixed to the casing 211 through the first lid member 221 outside the lubricating oil 215, and the attracting body 231 is supported by the support member 241 and positioned in the lubricating oil 215. If the screws or the like of the first lid member 221 are removed, a worker can grip the first lid member 221 and extract the attracting body 231 to the outside of the lubricating oil 215.

A plate-like rib 249 is provided at a connection place between the connection portion 243 and the fixed portion 247. The support member 241 supports the attracting body 231 at the free end side. Flow occurs in the lubricating oil 215 due to the operation of the gears 213*a* to 213*f*, whereby a force which displaces the attracting body 231 acts, and thus a load acts on the connection place between the connection portion 243 which is a fixed end and the fixed portion 247. The support member 241 can resist the load at the rib 249, and thus the connection place has higher rigidity.

According to the foreign matter attracting structure 200 according to Embodiment 8, the nonmagnetic cover 235 covers the magnet 233, and therefore, if the magnet 233 is extracted from the nonmagnetic cover 235, a magnetic force does not act on the foreign matter 251 on the outside of the nonmagnetic cover 235. For this reason, the foreign matter 251 attracted to the surface of the nonmagnetic cover 235 can be easily removed, for example, by sweeping off the surface of the nonmagnetic cover 235, and thus maintenance is excellent. Further, the foreign matter 251 is attracted by the magnet 233, and therefore, capture of fine foreign matter 251 is also possible and the flow of the lubricating oil 215 is almost not inhibited. Further, the nonmagnetic cover 235 covers the magnet 233, and therefore, the surface area of the nonmagnetic cover 235 becomes greater than the magnet 233, and thus the attracted amount of the foreign mater 251 is increased, whereby the foreign mater 251 can be effectively attracted. In particular, the groove portions 237 are formed, whereby the surface area of the nonmagnetic cover 235 is further increased, and therefore, the attracted amount of the foreign mater 251 is further increased. Further, the groove portions 237 are formed in the nonmagnetic cover 235, and therefore, if the attracting body 231 is disposed such that the groove portions 237 are arranged in the vertical direction, the foreign matter is caught on wall surfaces of the groove portions 237, whereby the attracted amount is further increased.

Further, the fixed portion 247 of the support member 241 is fixed outside the lubricating oil 215, and therefore, a worker can grip the fixed portion 247 and extract the attracting body 231 without putting the hand in the lubricating oil 215. In particular, the fixed portion 247 is fixed to the first lid member 221, and therefore, when the first lid member 221 is removed for the inspection or the like of the inside of the casing 211, the attracting body 231 can be extracted to the outside of the casing 211 along with the first lid member 221. For this reason, it is possible to easily confirm the attraction situation of the foreign matter 251 to the attracting body 231 along with the inspection of the inside of the casing 211.

Further, the entire outer surface of the magnet 233 is covered with the nonmagnetic cover 235, and therefore, the foreign matter 251 is not directly attracted to the magnet 233 while the attracting body 231 is present in the casing 211. For this reason, when the magnet 233 is extracted from the nonmagnetic cover 235, if the magnet 233 is removed such that the foreign matter 251 on the surface of the nonmagnetic cover 235 is not stuck to the magnet 233, labor to remove the foreign matter 251 from the surface of the magnet 233 is suppressed.

Figure 13:
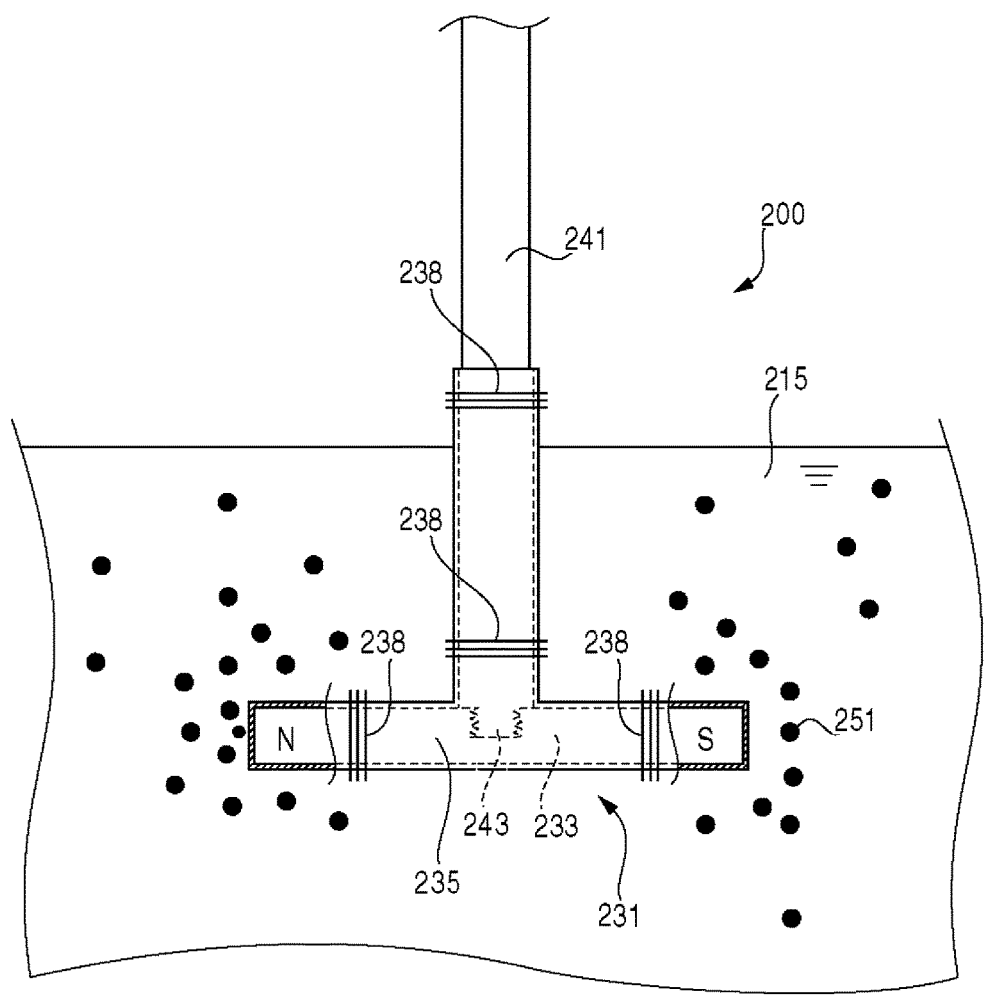
FIG. 13 is a front view showing the structure of an attracting body as a first modified example.

FIG. 13 shows the structure of the attracting body 231 as a first modified example. The attracting body 231 of this modified example has the magnet 233 supported on a lower end of the support member 241, and the nonmagnetic cover 235 which covers the magnet 233. The magnet 233 is formed in a rod shape and supported such that the longitudinal direction thereof is orthogonal to the longitudinal direction of the support member 241. Further, in the magnet 233, one end side in the longitudinal direction thereof is made so as to be the N-pole and the other end side is made so as to be the S-pole.

The nonmagnetic cover 235 is composed of a film-like soft nonmagnetic material such as a thin plastic film. The nonmagnetic cover 235 is formed in the form of a bag with an opening provided in an upper portion thereof. In the nonmagnetic cover 235, the magnet 233 is disposed on the bottom side thereof and the support member 241 is disposed on the opening side. The nonmagnetic cover 235 covers the entirety of the magnet 233 and covers a lower end portion of the support member 241.

The nonmagnetic cover 235 is fixed to the magnet 233 by being brought into close contact with the magnet 233 and the connection portion 243, for example, by being tightened around the connection portion 243 of the support member 241, and then winding string-like members 238 around a plurality of places on both end sides in the longitudinal direction of the magnet 233 and a plurality of vertically spaced-apart places of the connection portion 243. Due to the winding of the string-like members 238, even if the foreign matter 251 in the lubricating oil 215 infiltrates from the opening of the nonmagnetic cover 235, infiltration of the foreign matter 251 further toward the bottom side than the wound position is suppressed, and thus attraction of the foreign matter 251 to the magnet 233 is prevented. If the string-like members 238 are removed, it becomes possible to take in and out the magnet 233 of the attracting body 231 through the opening of the nonmagnetic cover 235. The string-like member 238 is composed of a weakly magnetic material such as a soft iron wire. A paramagnetic material such as soft iron is included in the weakly magnetic material. In addition, the string-like member 238 may be composed of a nonmagnetic material such as a synthetic fiber.

In this modified example, by extracting the attracting body 231 along with the support member 241 from the lubricating oil 215, removing the string-like members 238, and removing the plastic film 235 from the magnet 233, it is possible to easily remove the foreign matter 251 such as iron powder stuck to the surface of the plastic film 235. In a case where the string-like member 238 is composed of a wire made of a weakly magnetic material, when the string-like member 238 is wound around the magnet 233, the wire itself also becomes magnetized, thereby attracting the foreign matter 251. On the other hand, if the wire 238 is removed from the magnet 233, magnetism is lost, and therefore, it is possible to easily remove the foreign matter 251 stuck to the wire 238.

Figure 14A:
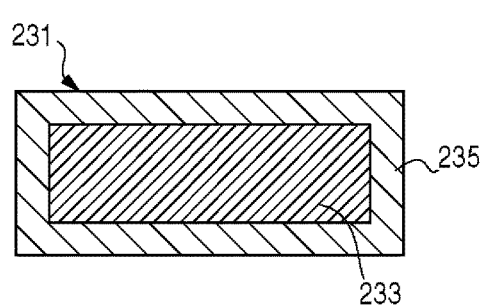
FIG. 14A is a sectional front view showing the structure of an attracting body as a second modified example.
Figure 14C:
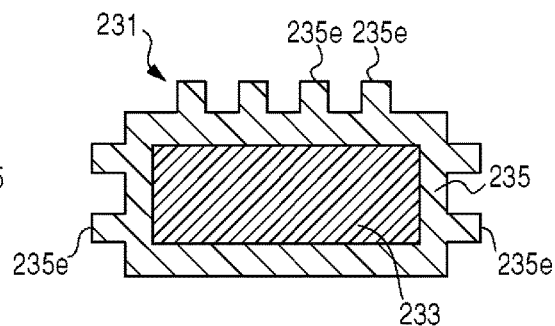
FIG. 14C is a sectional front view showing the structure of an attracting body as a third modified example.
Figure 14B:
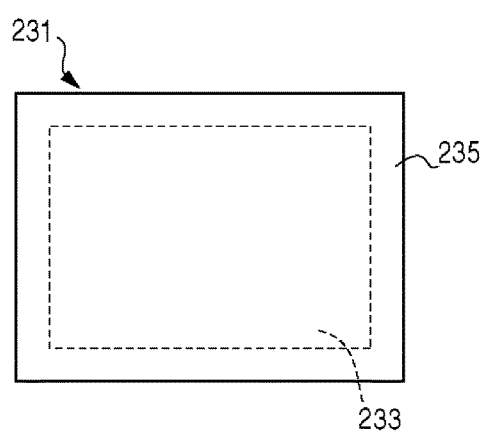
FIG. 14B is a plan view thereof.

FIGS. 14A to 14D show the structures of the attracting bodies 231 as a second modified example and a third modified example. The nonmagnetic cover 235 and the magnet 233 may be formed in rectangular parallelepiped shapes having similar outer shapes, as shown in FIGS. 14A and 14B. In addition to this, the outer shapes thereof may be circular shapes which are similar to each other, trapezoidal shapes, or the like. In addition, the nonmagnetic cover 235 and the magnet 233 need not necessarily be in close contact with each other, and it is preferable that the nonmagnetic cover 235 and the magnet 233 are made in an easily separable seal structure.

Figure 14D:
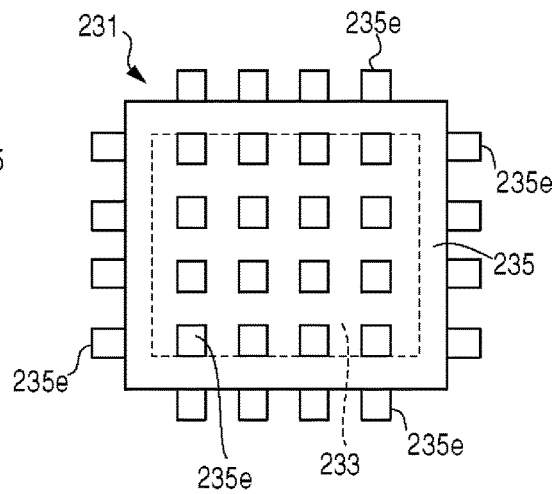
FIG. 14D is a plan view thereof.

Further, as shown in FIGS. 14C and 14D, a plurality of convex portions 235e may be provided on the surface of the nonmagnetic cover 235. In this way, the nonmagnetic cover 235 and the magnet 233 have non-similar outer shapes, and thus the surface area of the nonmagnetic cover 235 is increased more than in a case where similar outer shapes are adopted, whereby the attracted amount of the foreign matter 251 is increased. In order to increase the surface area of the nonmagnetic cover 235, a plurality of concave portions may be provided in the surface, or a plurality of convex portions and concave portions may be alternately provided, thereby forming a waveform or the like. Further, the magnet 233 and the nonmagnetic cover 235 may be made so as to have non-similar outer shapes by making the outer shape of the magnet 233 be a rectangular parallelepiped shape and making the outer shape of the nonmagnetic cover 235 be a circular shape, a trapezoidal shape, or the like.

[Embodiment 9]

Figure 15:
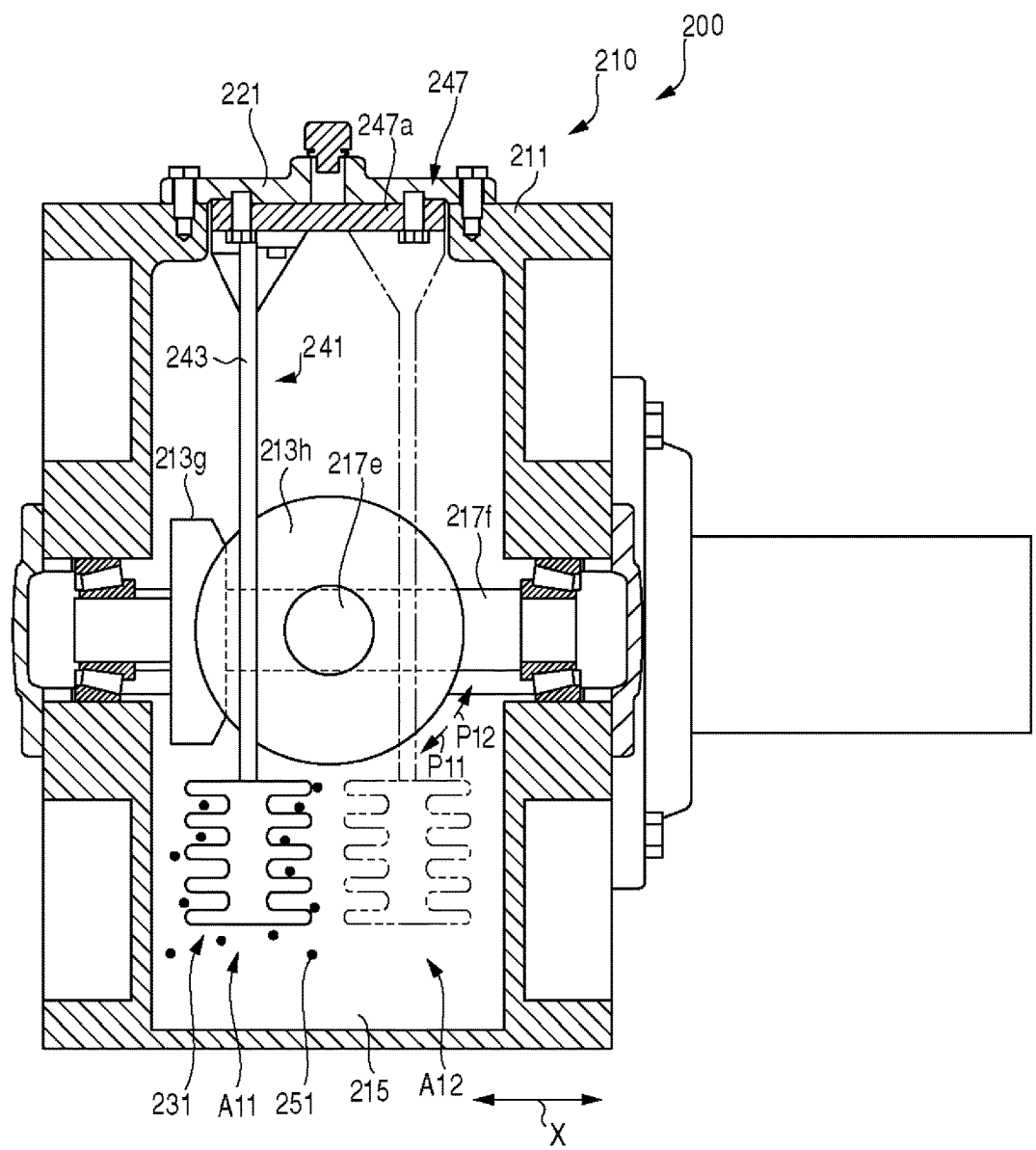
FIG. 15 is a sectional front view showing a foreign matter attracting structure according to Embodiment 9.
Figure 16:
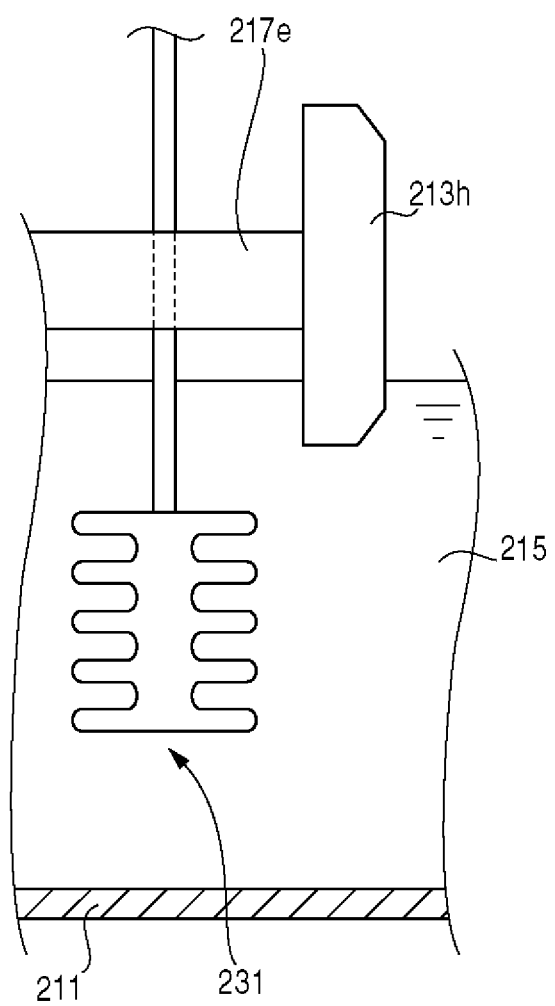
FIG. 16 is a partial sectional side view showing the foreign matter attracting structure according to Embodiment 9.

FIGS. 15 and 16 show the configuration of the foreign matter attracting structure 200 according to Embodiment 9. In the following Embodiments 9 to 11, the same elements as the elements described in Embodiment 8 are denoted by the same reference numerals and overlapping description is omitted. The gear device 210 is an orthogonal-shaft gear reducer, and a first bevel gear 213h fixed to an input shaft 217e meshes with a second bevel gear 213g fixed to an intermediate shaft 217f. Hereinafter, a horizontal direction parallel to the intermediate shaft 217f is described as the X-direction.

The attracting body 231 is installed at a first position A11 deviated from the input shaft 217e to one side in the X-direction, in the lubricating oil 215. In FIG. 15, the first position A11 is shown by a solid line. The connection portion 243 of the support member 241 can be connected to any of a plurality of places of the fixed portion 247. That is, the fixed portion 247 has a plurality of mounting portions for mounting the attracting body 231 (the support member 241). When a connection place of the support member 241 is changed, the attracting body 231 is installed at a second position A12 deviated from the input shaft 217e to the other side in the X-direction. In FIG. 15, the second position A12 is shown by a two-dot chain line. That is, the attracting body 231 can be installed at any of the plurality of positions A11 and A12 in the casing 211.

When the first bevel gear 213h and the second bevel gear 213g rotate, due to flow which occurs due to the movement of the first bevel gear 213h and the second bevel gear 213g in the lubricating oil 215, much foreign matter 251 is gathered in a portion. The gathering position differs according to whether the rotation of the first bevel gear 213h is in a positive direction P11 or a reverse direction P12. The first position A11 where the attracting body 231 is installed is provided at a position where much foreign matter 251 is gathered when the first bevel gear 213h rotates in the positive direction P11, and the second position A12 is provided at a position where much foreign matter 251 is gathered when the first bevel gear 213h rotates in the reverse direction P12. A worker grasps the rotation direction of the first bevel gear 213h in advance and installs the attracting body 231 at a position where much foreign matter 251 is gathered, of the plurality of positions A11 and A12.

According to the foreign matter attracting structure 200 according to Embodiment 9, the attracting body 231 can be installed at a position selected from the plurality of positions A11 and A12, and therefore, if the installation position of the attracting body 231 is changed according to the rotation direction of the first bevel gear 213h, it is possible to effectively attract the foreign matter 251. In addition, the attracting bodies 231 may be installed at both the position A11 and the position A12.

[Embodiment 10]

Figure 17:
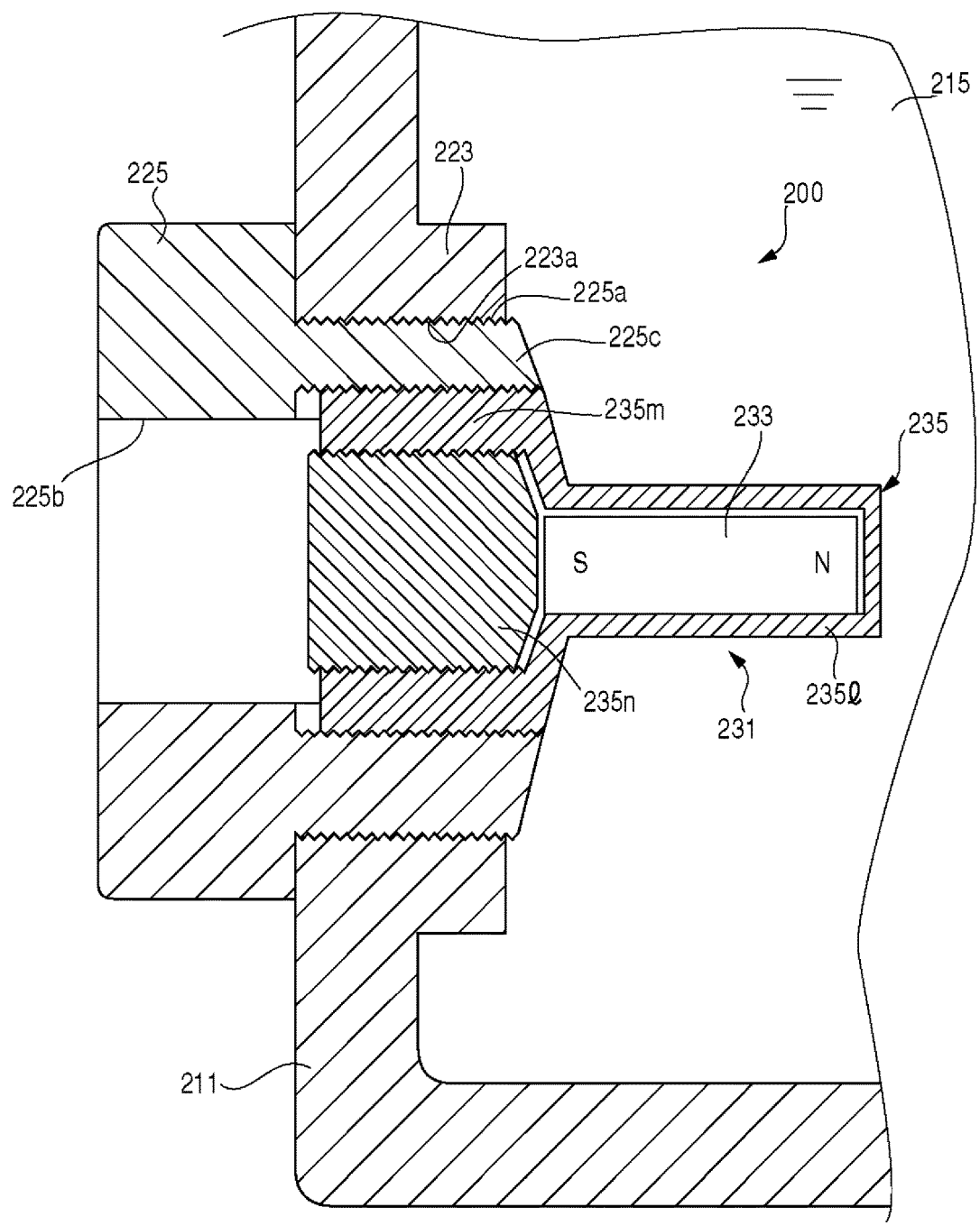
FIG. 17 is a partial sectional view showing an attracting body according to Embodiment 10.

FIG. 17 shows a partial sectional view showing the foreign matter attracting structure 200 according to Embodiment 10. The casing 211 is further provided with a drain portion 223 and a drain plug 225. The drain portion 223 is provided in order to discharge the lubricating oil 215 in the casing 211.

The drain plug 225 has a screw portion 225a which is screwed into a female screw hole 223a formed in the drain portion 223. That is, the drain plug 225 is detachably mounted on the drain portion 223. The drain plug 225 is formed of a weakly magnetic material such as soft iron, and thus magnetization of the casing 211 by the magnetic force of the magnet 233 can be reduced. Further, a through-hole 225b is formed at the center of the drain plug 225. A mounting portion 225c on which the nonmagnetic cover 235 is detachably mounted is provided at one end portion, specifically, an end portion on the casing 211 side, of the through-hole 225b.

The attracting body 231 is provided with the magnet 233, and the nonmagnetic cover 235 which covers the magnet 233 and is mounted on the drain plug 225. The magnet 233 has a rod shape and is made such that one end side in the longitudinal direction thereof is the S-pole and the other end side is the N-pole. The nonmagnetic cover 235 has a mounting portion 235m which is mounted on the mounting portion 225c of the drain plug 225, and a magnet accommodating portion 235l which is formed to extend from one end portion of the mounting portion 235m and accommodates the magnet 233. The magnet accommodating portion 235l is disposed in the lubricating oil 215. The other end portion side of the mounting portion 235m is open, and the magnet 233 can be incorporated into and extracted from the magnet accommodating portion 235l through the opening. The opening of the mounting portion 235m is blocked by a lid member 235n. In the attracting body 231, the magnet 233 can be taken in and out of the nonmagnetic cover 235 by removing the lid member 235n.

According to the foreign matter attracting structure 200 according to Embodiment 10, when the drain plug 225 is removed from the casing 211, the attracting body 231 is extracted, and it is possible to confirm the attraction situation of the foreign matter 251 to the attracting body 231 along with the discharge of the lubricating oil 215. Further, when the drain plug 225 is removed from the casing 211, the lid member 235n is removed, and the magnet 233 is extracted from the magnet accommodating portion 235l, whereby it is possible to easily remove the foreign matter stuck to the outer peripheral surface of the magnet accommodating portion 235l.

[Embodiment 11]

Figure 18:
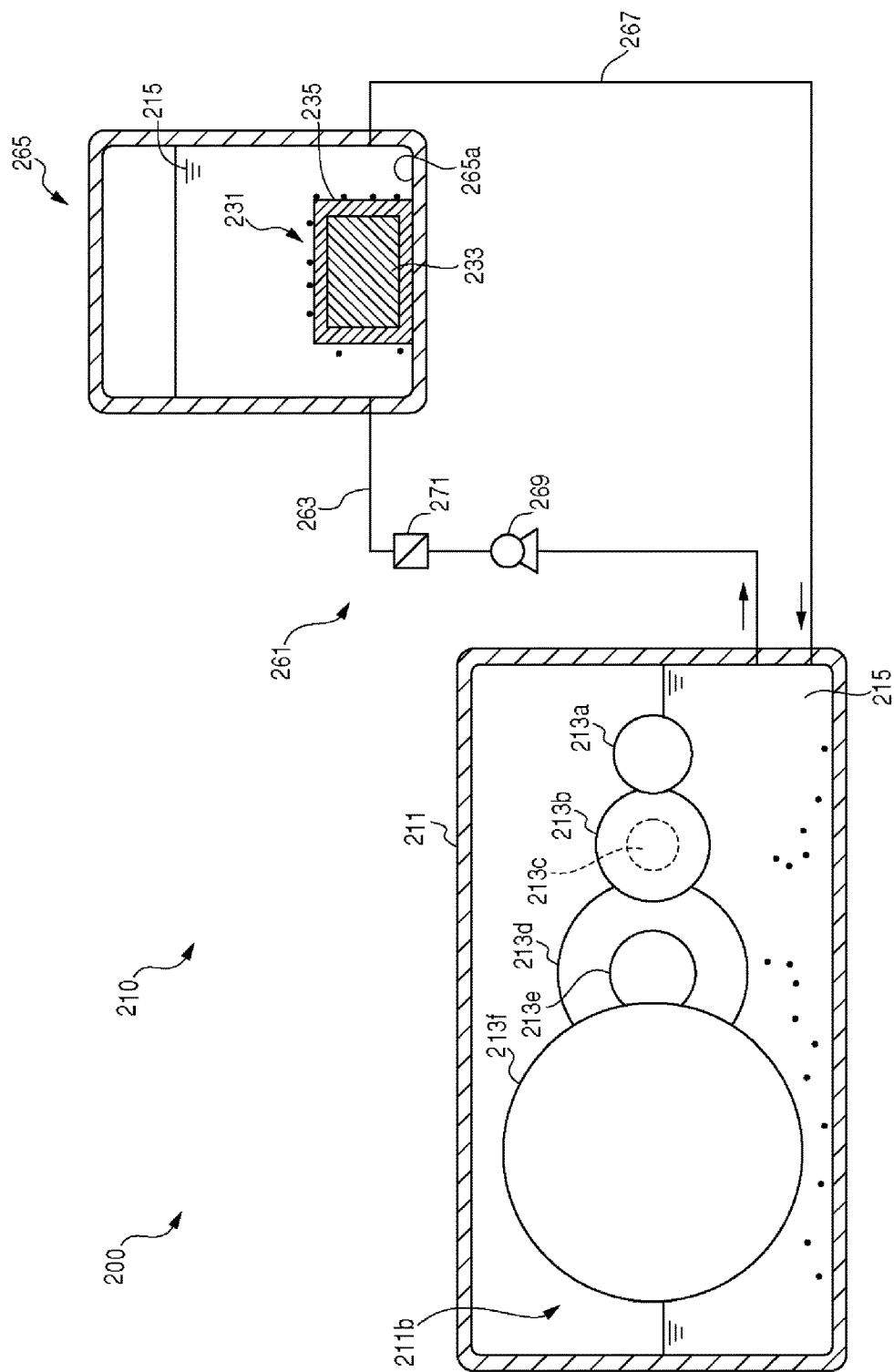
FIG. 18 is a block diagram showing a foreign matter attracting structure according to Embodiment 11.

FIG. 18 shows the configuration of the foreign matter attracting structure 200 according to Embodiment 11. The gear device 210 is provided with a circulation flow path 261 for a dry sump. A suction passage 263, an oil tank 265, and a discharge passage 267 are provided in order in the course of the circulation flow path 261.

A pump 269 and a strainer 271 are provided in order in the course of the suction passage 263. In the circulation flow path 261, the lubricating oil 215 in the circulation flow path 261 is forcibly transported by the driving of the pump 269. In this way, the circulation flow path 261 sucks the lubricating oil 215 from a gear accommodating chamber 211b provided in the casing 211 and discharges the lubricating oil 215 to the gear accommodating chamber 211b again through the suction passage 263, the oil tank 265, and the discharge passage 267. In addition, the gear accommodating chamber 211b is a space which accommodates the gears 213a to 213f in the casing 211.

The strainer 271 captures the foreign matter 251 passing through the suction passage 263. The oil tank 265 is provided separately from the gear accommodating chamber 211b of the casing 211. The attracting body 231 is installed on an inner bottom surface 265a in the oil tank 265. The attracting body 231 attracts the foreign matter 251 which flows in without being captured by the strainer 271.

According to the foreign matter attracting structure 200 according to Embodiment 11, the attracting body 231 is installed in the oil tank 265 away from the gear accommodating chamber 211b, and therefore, the operation of the gears 213a to 213f or the like in the gear accommodating chamber 211b is not inhibited by the magnet 233. Accordingly, the magnet 233 having a large attractive force can be used, and thus the attracted amount of the foreign matter 251 is increased.

Further, the attracting body 231 is installed in the oil tank 265, and therefore, it is possible to increase the attracted amount of the foreign matter 251 by making the attracting body 231 greater than in a case where the attracting body 231 is installed in the suction passage 263 or the discharge passage 267. Further, the capture of the foreign matter 251 is performed by the attracting body 231, and therefore, it is possible to simplify or omit the strainer 271 in performing dry sump.

Certain embodiments of the invention have been described above. However, the embodiments merely show the principle and application of the invention. Further, in the embodiments, many modified examples or a change in disposition is possible within a scope which does not depart from the idea of the invention as defined in the claims.

In the embodiments described above, an example has been described in which the foreign matter attracting structure is used in a gear device provided with a plurality of gears. However, in addition to this, the foreign matter attracting structure may be used in an internal combustion engine such as an engine, or an air conditioner such as a compressor as long as it is a device which includes a mechanical component in which friction occurs, such as a piston, a cylinder, or a bearing. Further, the parallel-shaft gear reducer or the orthogonal-shaft gear reducer has been described as the gear device. However, as long as a gear is present in a casing, the type of a speed reducing mechanism is not particularly limited, and for example, a differential gear mechanism is also acceptable.

The attracting body may be installed in a lubricating oil passage provided on the liquid surface of lubrication oil, or at a predetermined lubrication target place such as a place to which lubricating oil which is splashed by a gear is scattered, in addition to being installed in lubricating oil. The attracting body may not be provided with a nonmagnetic cover. Further, the attracting bodies may be installed at a plurality of places as predetermined lubrication target places.

Further, the attracting body may be installed in a suction passage or a discharge passage other than an oil tank, in a case where it is installed in a circulation flow path. The circulation flow path may be provided in a casing separately from a gear accommodating chamber.

The attracting body is not particularly limited with respect to a structure in which the magnet is taken in and out of the nonmagnetic cover. For example, a configuration may be made in which a nonmagnetic cover is made in a structure capable of being divided into a plurality of portions and the respective divided portions are detachably connected by a screw or the like so as to be able to take in and out the magnet. Further, a configuration may be made in which after a magnet is put in a nonmagnetic cover divided into a plurality of portions, the respective divided portions are joined to each other by thermal welding or the like, and when extracting the magnet, the nonmagnetic cover is cut.

The capturing body may not be fixed to the magnet as long as the capturing body is disposed at a position which is magnetized by the magnetic force of the magnet. Further, a configuration may be made such that a magnet is made in a shape such as a ring shape in which lubricating oil can pass through the inside thereof, and a capturing body is disposed on the inside thereof.

As the magnet, in addition to a permanent magnet, an electromagnet maybe used, and a material thereof is not limited. As the nonmagnetic cover, a material is not limited like a resin material such as polycarbonate, as long as it is a nonmagnetic material. The mounting portion of the support member may be mounted on the attracting body by adhesion or the like other than a screw and may be provided integrally with the attracting body. The fixed portion of the support member may be fixed to a place other than the lid member, which is the inner surface of the casing. Further, the support member may be composed of a weakly magnetic material such as soft iron, thereby being used as a capturing body.

Further, in Embodiments 1 to 7 described above, with respect to the attracting body 20, a form in which it is supported by the support member 80, a form in which it is disposed in the lubricating oil flow path 130 with the position maintained, a form in which it is fixed to the drain plug 161, and a form in which it is placed on the inner bottom surface 101a of the casing 101 have been described. A combination of these forms may be also acceptable, and the attracting body 20 supported on the support member 80 or the attracting body 20 fixed to the drain plug 161 may be disposed in the oil tank 133.

Further, in Embodiments 8 to 11 described above, a form has been described in which only one of a case where the attracting body 231 is supported by the support member 241, a case where the attracting body 231 is fixed to the drain plug 225, and a case where the attracting body 231 is disposed in the oil tank 265 is adopted. There is no limitation thereto, and a plurality of disposition forms may be adopted, and the attracting body 231 supported on the support member 241 or the attracting body 231 fixed to the drain plug 225 may be disposed in the oil tank 265.

Certain embodiments of the invention relate to a foreign matter attracting structure for attracting foreign matter in lubricating oil which is used in a gear device or the like by an attracting body.

It should be understood that the invention is not limited to the above-described embodiment, but may be modified into various forms on the basis of the spirit of the invention. Additionally, the modifications are included in the scope of the invention.

What is claimed is:

1. A foreign matter attracting structure comprising:
   an attracting body for attracting foreign matter in lubricating oil; wherein the attracting body includes
     a magnet,
     a capturing body composed of a weakly magnetic material, and
     a nonmagnetic cover externally covering the magnet; and
   the capturing body is disposed along an outer side of the nonmagnetic cover, in a position where the capturing body is magnetized by magnetic force of the magnet.

2. The foreign matter attracting structure according to claim 1, wherein the capturing body is configured such that the lubricating oil can pass through an inside thereof.

3. The foreign matter attracting structure according to claim 1, wherein the capturing body is composed of an aggregate of a wire made of a weakly magnetic material.

4. The foreign matter attracting structure according to claim 1, incorporated into a gear device in which lubricating oil lubricates gears.

5. The foreign matter attracting structure according to claim 1, further comprising:
   a support member which includes a fixed portion fixed outside the lubricating oil, the lubricating oil being stored in a gear device, and a mounting portion which is mounted on the attracting body,
   wherein the attracting body is positioned in the lubricating oil by the support member.

6. The foreign matter attracting structure according to claim 5, wherein the fixed portion of the support member is fixed to a lid member which opens and closes an inspection port of the gear device.

7. The foreign matter attracting structure according to claim 1, wherein the outer form of the nonmagnetic cover is nonanalogous to the outer form of the magnet.

8. The foreign matter attracting structure according to claim 1, wherein the nonmagnetic cover covers the entire outer surface of the magnet.

9. The foreign matter attracting structure according to claim 1, wherein the attracting body is configured such that the magnet can be taken in and out of the nonmagnetic cover.

10. The foreign matter attracting structure according to claim 1, wherein the nonmagnetic cover is fixed to the magnet by a cord made of either a nonmagnetic material or a weakly magnetic material, wound around the nonmagnetic cover.

11. The foreign matter attracting structure according to claim 1, wherein the capturing body is fixed by the magnetic force of the magnet.

12. The foreign matter attracting structure according to claim 1, wherein the capturing body is in contact with the nonmagnetic cover on the outside of the nonmagnetic cover.

* * * * *